(12) United States Patent
Donnelly et al.

(10) Patent No.: US 9,459,747 B2
(45) Date of Patent: Oct. 4, 2016

(54) TOUCH DISPLAY SYSTEM WITH REDUCED MOIRÉ PATTERNS

(71) Applicant: Microsoft Technology Licensing, LLC, Redmond, WA (US)

(72) Inventors: Sean M. Donnelly, Portland, OR (US); Jason D. Wilson, West Linn, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/567,566

(22) Filed: Dec. 11, 2014

(65) Prior Publication Data
US 2016/0170517 A1    Jun. 16, 2016

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01); *G06F 2203/04103* (2013.01); *G06F 2203/04112* (2013.01)

(58) Field of Classification Search
CPC ................. G06F 3/044; G06F 3/0412; G06F 2203/04103; F06F 2203/04103
See application file for complete search history.

(56) References Cited

U.S. PATENT DOCUMENTS

| 8,472,081 | B2 | 6/2013 | Shacham et al. |
| 8,599,150 | B2 | 12/2013 | Philipp |
| 2009/0273577 | A1 | 11/2009 | Chen et al. |

(Continued)

FOREIGN PATENT DOCUMENTS

WO    2014021225 A1    2/2014

OTHER PUBLICATIONS

Amidror, Isaac, "The Theory of the Moire Phenomenon, vol. I: Periodic Layers, Second Edition", Springer, Jun. 19, 2009, 545 pages. Submitted in three parts.

(Continued)

*Primary Examiner* — Premal Patel
(74) *Attorney, Agent, or Firm* — Brandon Roper; Judy Yee; Micky Minhas

(57) ABSTRACT

A display device includes an array of display pixels having display pixel apertures that are periodic along two orthogonal directions, x and y, at spatial frequencies $f_x$ and $f_y$, respectively. An array of electrodes is overlaid on the array of display pixel apertures. The array of electrodes is comprised of a metal mesh having openings that are periodic along a first direction u at an angle $\theta_u$ relative to x, and along a second direction v at an angle $\theta_v$ relative to y, and at spatial frequencies $f_u$ and $f_v$. The array of electrodes is overlaid on the array of display pixels such that the parameter set $\{\theta_u, f_x, f_u, \theta_v, f_y, f_v\}$ satisfies specific geometric criteria in order to minimize perceptible moiré patterns.

20 Claims, 8 Drawing Sheets

(56) References Cited

U.S. PATENT DOCUMENTS

| | | |
|---|---|---|
| 2012/0242606 A1 | 9/2012 | Mackey |
| 2012/0262412 A1 | 10/2012 | Guard et al. |
| 2013/0050815 A1 | 2/2013 | Fukushima et al. |
| 2013/0176725 A1 | 7/2013 | Hajjar et al. |
| 2013/0294037 A1* | 11/2013 | Kuriki ............... H05K 9/00 361/748 |
| 2013/0299222 A1 | 11/2013 | Lee et al. |
| 2013/0314512 A1 | 11/2013 | Watanabe et al. |
| 2014/0009770 A1 | 1/2014 | Chen et al. |

OTHER PUBLICATIONS

Saveljev, et al., "MoiréMinimization Condition in Three-Dimensional Image Displays", In Journal of Display Technology, vol. 1, No. 2, Dec. 2005, pp. 347-353.

Jung, Jae-Hyun, "Color MoiréPattern Simulation and Analysis in Three-Dimensional Integral Imaging for Finding the Moiré-Reduced Tilted Angle of a Lens Array", Retrieved on: Apr. 16, 2014 Available at: http://scholar.harvard.edu/jaehyun_jung/publications/color-moir%C3%A9-pattern-simulation-and-analysis-three-dimensional-integral.

Byun, et al., "An Efficient Simulation and Analysis Method of Moire Patterns in Display Systems", In Proceedings of Optics Express, vol. 23, No. 3, Feb. 3, 2014.

ISA European Patent Office, International Search Report and Written Opinion Issued in Application No. PCT/US2015/062876, Mar. 11, 2016, WIPO, 11 Pages.

* cited by examiner

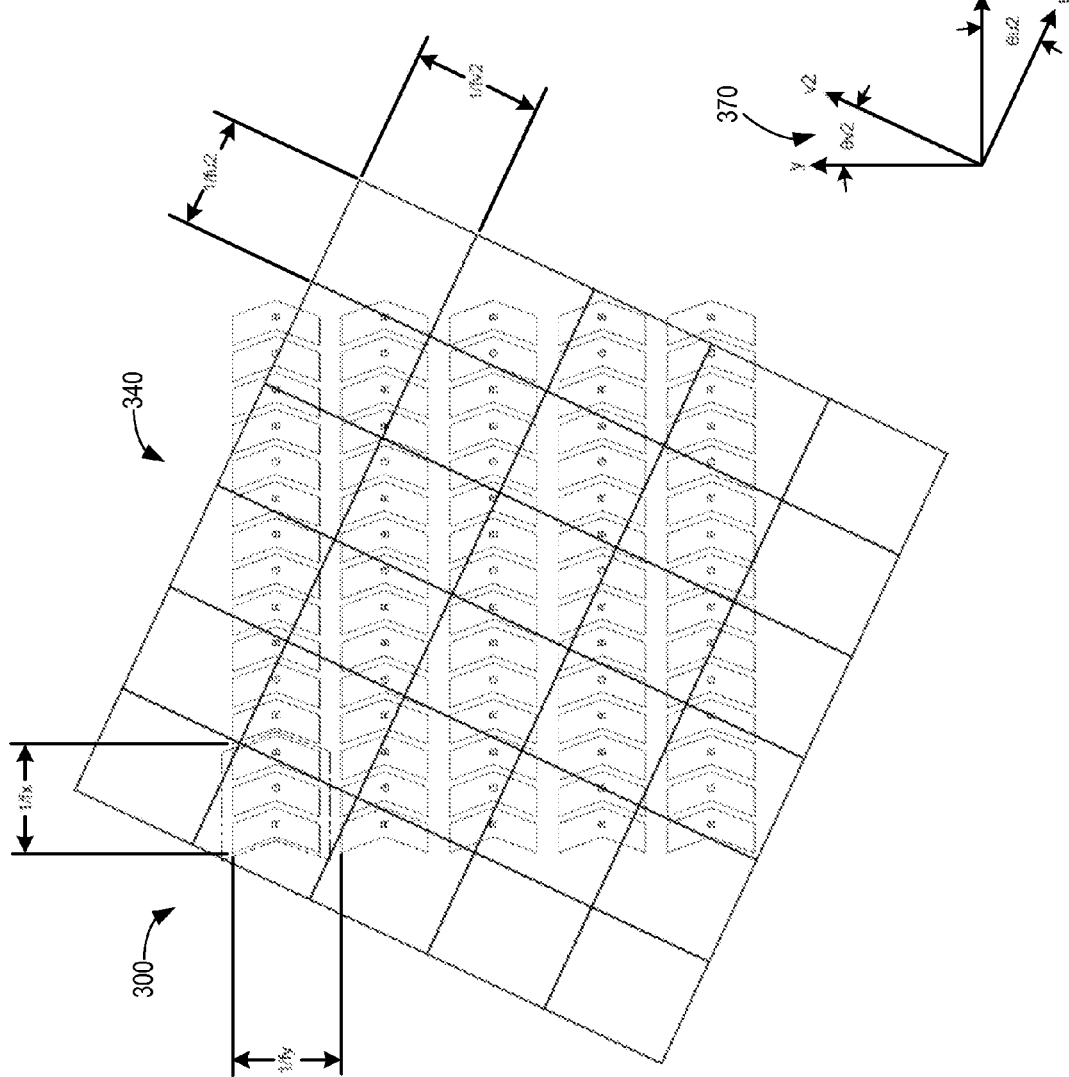

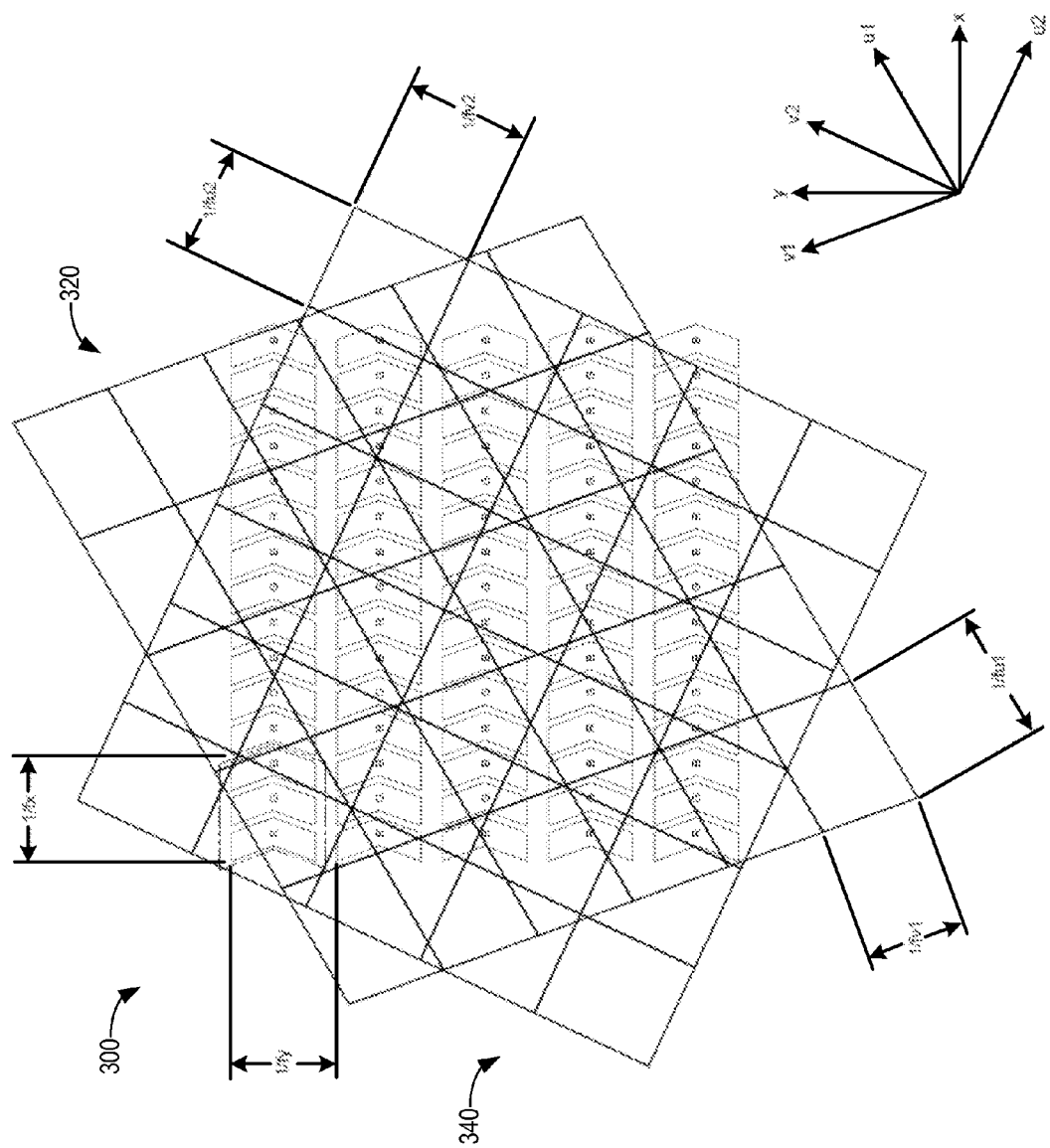

TOUCH DISPLAY SYSTEM WITH REDUCED MOIRÉ PATTERNS

BACKGROUND

A capacitive touch sensor may comprise a matrix of electrically conducting column and row electrodes, with electronics to measure the capacitance from each row to each column. Depending on the electrode geometry, the proximity of a user's finger or other object may cause a change in that capacitance. When used with a display device, a capacitive touch sensor is typically attached to the user-facing surface of the display, to maximize the signal-to-noise ratio of the capacitance-change measurement. To avoid obstructing the user's view of the display panel, the sensor's electrodes may consist either of an optically transparent, electrically conductive material, or of an opaque electrically conductive material of low areal solidity, such as a mesh of narrow metal conductors. Because the available transparent conductive materials have relatively low electrical conductivity, metal-mesh electrodes are presently favored for capacitive touch sensors requiring electrodes exceeding roughly 0.5 meters in length. However, any superposition of two or more unlike periodic structures, or of identical periodic structures having a relative angular displacement, will produce perceptible moiré patterns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A display device includes an array of display pixels having display pixel apertures that are periodic along two orthogonal directions, x and y, at spatial frequencies $f_x$ and $f_y$, respectively. An array of electrodes is overlaid on the array of display pixel apertures. The array of electrodes is comprised of a metal mesh having openings that are periodic along a first direction u at an angle $\theta_u$ relative to x, and along a second direction v at an angle $\theta_v$ relative to y, and at spatial frequencies $f_u$ and $f_v$. The array of electrodes is overlaid on the array of display pixels such that the parameter set $\{\theta_u, f_x, f_u, \theta_v, f_y, f_v\}$ satisfies specific geometric criteria in order to minimize perceptible moiré patterns.

BRIEF DESCRIPTION OF THE DRAWINGS

FIG. 3E shows a schematic top view of a metal mesh for a transmit electrode matrix overlaid on a pixel array in accordance with the present disclosure.

FIG. 3F shows a schematic top view of a metal mesh for a transmit electrode matrix and a metal mesh for a receive electrode matrix overlaid on a pixel array in accordance with the present disclosure.

DETAILED DESCRIPTION

Figure 1:
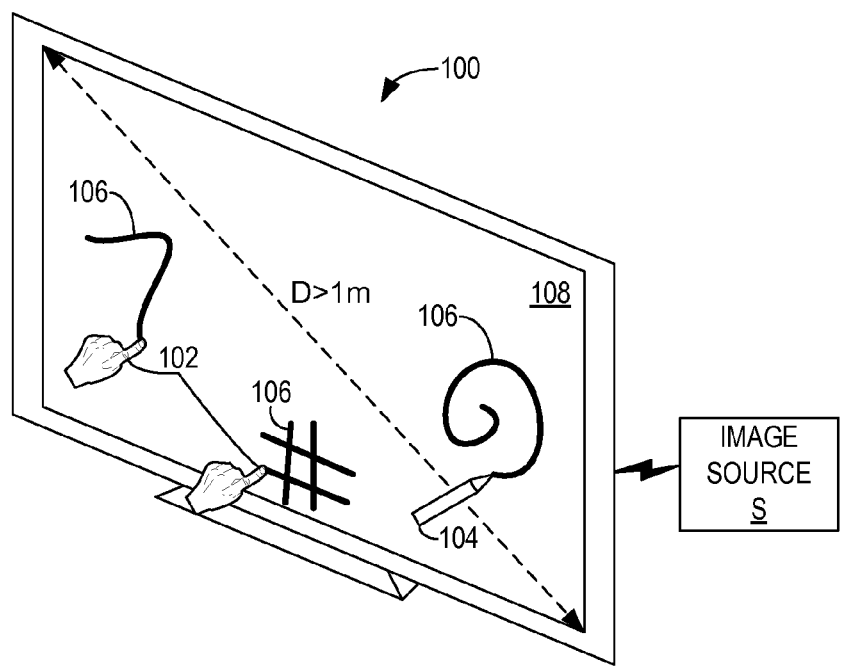
FIG. 1 is a perspective view of a large format multi-touch display device in accordance with one embodiment of the present disclosure.

The superposition of two or more unlike periodic structures, or of identical periodic structures having a relative angular displacement, will produce moiré effects. These effects can be regarded as a superposition (hereafter "moiré image") of numerous individual moiré orders ("moirés"), each a periodic modulation of luminance (and color, if any of the structures is polychromatic). The shape, spatial frequency, and optical contrast of each moiré is determined by the spatial periods of the structures, the shapes and sizes of the periodic elements, and the displacements between the structures.

Where two or more planar periodic structures lie in different planes, such as in parallel planes that are spaced apart by some distance, the moiré image varies with observer position due to the parallax effect. For a moving observer, each individual moiré band exhibits a unique apparent velocity, which may increase its perceptibility. Such effects can be simulated by computational ray-tracing, but while such simulation can predict the moiré image resulting from a given superposition for a given observer position, it provides limited insight into how the periodic structures should be altered to minimize the perceptibility of the moirés over a broad range of observer positions.

When binary periodic structures are superposed, the number of moirés contributing to the moiré image is theoretically infinite, but only a finite number of these are perceptible to a human observer. A moiré may be perceptible for any of several reasons. For example, moiré band luminance contrast may exceed the observer's perception threshold, while the moiré band spatial frequency lies within the range of perceptible spatial frequencies. The range of perceptible spatial frequencies is bounded by the observer's visual acuity and field of vision. In another example, moiré band color contrast may exceed the observer's perception threshold, while moiré band spatial frequency lies within the range of perceptible spatial frequencies. Further, moiré band apparent velocity may exceed the user's perception threshold. Remarkably, moiré band apparent motion is sometimes perceived even when the moiré band spatial frequency exceeds the observer's visual acuity.

This superposition of multiple periodic structures, sometimes including display pixels of complex shape and varying color, in multiple planes, produces numerous moirés that may be perceptible and distracting to the display user. Particularly in large scale touch displays (e.g. 0.5 meters or greater in extent), where the display subtends a major fraction of the user's visual field, moirés may be made significantly more distracting by parallax-induced apparent motion because portions of the display are often within the user's peripheral vision field, which has higher sensitivity to apparent motion than does the central foveal vision field.

Several techniques have been used to minimize the perceptibility of moirés in metal-mesh touch display systems. In one example, the line width of the mesh elements may be reduced. The spatial frequencies of the moirés remain unchanged, but their optical contrasts are reduced, making them less perceptible to users. Manufacturers of metal mesh touch electrodes routinely attempt to minimize line width, subject to limits imposed by manufacturing technology. Although line widths continue to trend downward, the improvement is partially offset by a trend toward increased display resolution, which increases moiré contrast—as each pixel becomes smaller, a greater fraction of its area is occluded by a conductor of given line width. Reduced line width may also undesirably increase the occurrence of discontinuity defects, and increases the electrodes' electrical resistance. Tolerance of discontinuity defects may be increased by decreasing the pitch of the mesh, however, this may decrease transmission of the electrodes, and further give rise to highly perceptible moirés.

In another example, the distances between the display pixel aperture, column electrode mesh, and row electrode mesh planes may be reduced. This reduces the moirés' apparent velocities, and thus their perceptibility. Touch display manufacturers likewise strive to minimize the inter-plane distances, but the minimum thicknesses of substrates and optical adhesive layers are constrained by their mechanical properties.

Another approach is to make one or both metal meshes aperiodic. In theory, the use of fully random meshes eliminates all moiré phenomena. Several manufacturers have offered aperiodic meshes. In one approach, the mesh is formed by a randomly self-assembling conductive material. In a second approach, the mesh is in the form of a stochastic Voronoi tessellation, with the mesh openings consisting of polygons of widely varying size and number of sides. The two approaches have been largely effective in eliminating moirés, but give rise to an objectionable degree of display sparkle due to the resulting large variations in occlusion among adjacent pixels. In a third approach, the mesh is similar to a periodic mesh, but with stochastic perturbations of the vertices of the typically quadrilateral mesh openings; such meshes have not greatly reduced moiré perceptibility because of the limited spreading of spatial frequencies. In essence, designers can trade between objectionable moirés and objectionable sparkle by varying the degree of randomness, but intermediate degrees of randomness suffer from both problems.

As described herein, the spatial frequencies $\{f_{u1}, f_{v1}, f_{u2}, f_{v2}\}$ and directions of periodicity $\{\theta_{u1}, \theta_{v1}, \theta_{u2}, \theta_{v2}\}$ of the meshes may be optimized in order to minimize the perceptible moiré effects that would otherwise interfere with display images.

FIG. 1 shows a large format multi-touch display device 100 in accordance with an embodiment of the present disclosure. Display device 100 may have a diagonal dimension greater than 1 meter, for example. In other, particularly large-format embodiments, the diagonal dimension may be 55 inches or greater. Display device 100 may be configured to sense multiple sources of touch input, such as touch input applied by a digit 102 of a user or a stylus 104 manipulated by the user. Display device 100 may be connected to an image source S, such as an external computer or onboard processor. Image source S may receive multi-touch input from display device 100, process the multi-touch input, and produce appropriate graphical output 106 in response. Image source S is described in greater detail below with reference to FIG. 4.

Figure 2:
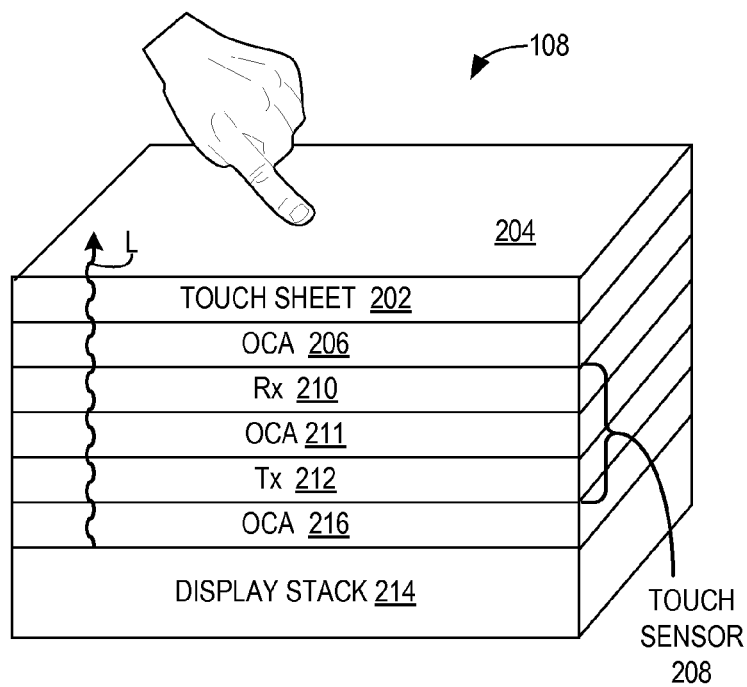
FIG. 2 is a cross-sectional view of an optical stack for a capacitive touch sensitive display of the large format multi-touch display device of FIG. 1.

Display device 100 may include a capacitive touch-sensitive display 108 to enable multi-touch sensing functionality. A schematic view of a partial cross section of an optical stack for capacitive touch-sensitive display 108 is shown in FIG. 2. In this embodiment, display 108 includes an optically clear touch sheet 202 having a top surface 204 for receiving touch input, and an optically clear adhesive (OCA) layer 206 bonding a bottom surface of touch sheet 202 to a top surface of a touch sensor 208. Touch sheet 202 may be comprised of a suitable material, such as glass or plastic. Those of ordinary skill in the art will appreciate that optically clear adhesives refer to a class of adhesives that transmit and/or permit passage of substantially all (e.g., about 99%) of incident visible light.

As discussed in further detail below with reference to FIGS. 3B-3F, touch sensor 208 is equipped with a matrix of electrodes comprising capacitive elements positioned a distance below touch sheet 202. As shown, the electrodes may be formed in two separate layers: a receive electrode layer 210 and a transmit electrode layer 212, which may each be formed on a respective dielectric substrate comprising materials including but not limited to glass, polyethylene terephthalate (PET), polycarbonate (PC), or cyclic olefin polymer (COP) film. Receive and transmit electrode layers 210 and 212 may be bonded together by a second optically clear adhesive layer 211. Adhesive layer 211 may be an acrylic pressure-sensitive adhesive film, for example. In other embodiments, however, layers 210, 211, and 212 may be integrally formed as a single layer with electrodes disposed on opposite surfaces of the integral layer.

Electrode layers 210 and 212 may be formed by a variety of suitable processes. Such processes may include deposition of metallic wires onto the surface of an adhesive, dielectric substrate; patterned deposition of a material that selectively promotes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. Although a transparent conductive oxide (TCO) (e.g. tin-doped indium oxide (ITO)) is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold, etc.), metallic alloys, conductive allotropes of carbon (e.g., graphite, fullerenes, amorphous carbon, etc.), conductive polymers, and conductive inks (e.g., made conductive via the addition of metal or carbon particles).

Receive electrode layer 210 may be designated a column electrode layer in which electrodes are at least partially aligned to a longitudinal axis (illustrated as a vertical axis), while transmit electrode layer 212 may be designated a row electrode layer in which electrodes are at least partially aligned to a lateral axis (illustrated as a horizontal axis). Such designation, however, is arbitrary and may be reversed. It will be appreciated that the vertical and horizontal axes depicted herein and other vertical and horizontal orientations are relative, and need not be defined relative to a fixed reference point (e.g., a point on Earth). To detect touch input, row electrodes may be successively driven with a time-varying voltage, while the column electrodes are held at ground and the current flowing into each column electrode is measured. The electrodes are configured to exhibit a change in capacitance of at least one of the capacitors in the matrix in response to a touch input on top surface 204. Capacitors may be formed, for example, at each vertical intersection between a column electrode and a row electrode.

Changes in capacitance may be detected by a detection circuit as time-varying voltages are applied. Based on the time of detection and the degree of attenuation and/or phase shift in a measured current, the capacitance under test can be estimated and a row and column identified as corresponding to a touch input. The structure of the column and row electrodes is described in greater detail below with reference to FIGS. 3B-3F.

Various aspects of touch sensor 208 may be selected to maximize the signal-to-noise ratio (SNR) of capacitance measurements and thus increase the quality of touch sensing. In one approach, the distance between the receive electrodes and a light-emitting display stack 214 is increased. This may be accomplished by increasing the thickness of optically clear adhesive layer 211, for example, which may reduce the noise reaching the receive electrodes. As non-limiting examples, the thickness of adhesive layer 211 may be less than 1 mm and in some embodiments less than 0.2 mm. The noise reaching the receive electrodes may be decreased by increasing the thickness of optically clear adhesive layer 216. Moreover, the relative arrangement of column and row conductors maximizes the average distance between the column and row conductors in the plane of touch sensor 208—e.g., in a direction substantially perpendicular to a direction in which light L is emitted from a light-emitting display stack 214.

Continuing with FIG. 2, light-emitting display stack 214, which may be a liquid crystal display (LCD) stack, organic light-emitting diode (OLED) stack, plasma display panel (PDP), or other flat panel display stack is positioned below the electrode layers 210 and 212. An optically clear adhesive (OCA) layer 216 joins a bottom surface of transmit electrode layer 212 to a top surface of display stack 214. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as a displayed image on top surface 204 of touch sheet 202.

Other embodiments are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

The number of perceptible moiré orders increases rapidly with the number of periodic structures, and with the geometric complexity of their periodic elements. Capacitive touch display systems incorporating metal-mesh electrodes typically present the user with a superposition of periodic structures in at least three non-coincident planes: display pixel apertures that are periodic along two orthogonal directions (herein designated x and y) at spatial frequencies $f_x$ and $f_y$; column electrodes comprised of a metal mesh having openings that are periodic along two directions $u_1$ and $v_1$ that are displaced by oblique angles $\theta_{u1}$ and $\theta_{v1}$, respectively, from x and y, at spatial frequencies $f_{u1}$ and $f_{v1}$; row electrodes comprised of a metal mesh having openings that are periodic along two directions $u_2$ and $v_2$ that are each oblique to $u_1$ and $v_1$, and displaced by oblique angles $\theta_{u2}$ and $\theta_{v2}$, respectively, from x and y, at spatial frequencies $f_{u2}$ and $f_{v2}$. Thus the only free parameters typically available to the display system designer to minimize moiré perceptibility are the spatial frequencies $\{f_{u1}, f_{v1}, f_{u2}, f_{v2}\}$ and directions of periodicity $\{\theta_{u1}, \theta_{v1}, \theta_{u2}, \theta_{v2}\}$ ("mesh parameters") of the meshes.

Figure 3A:
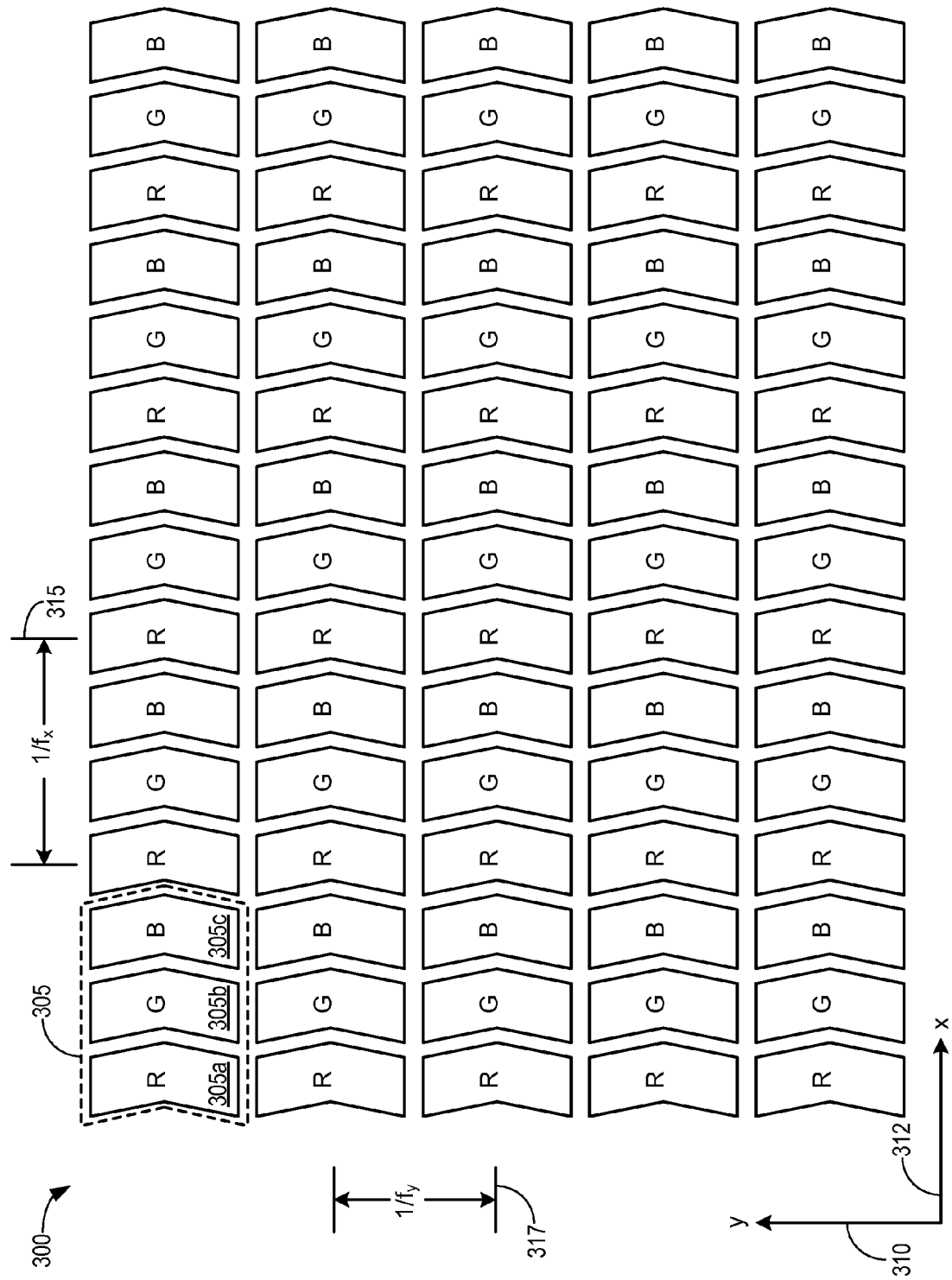
FIG. 3A shows a schematic top view of a pixel array in accordance with the present disclosure.

FIG. 3A shows an example pixel array 300 that may be disposed in a display stack, such as display stack 214. Pixel array 300 may comprise a plurality of pixels 305. It will be appreciated that "pixel" as used herein with reference to the illustrated embodiments may refer to one of several subpixels which may collectively form an overall pixel. In some embodiments, each pixel may be comprised of three subpixels of different color. For example, pixel 305 is comprised of red sub-pixel 305a, green sub-pixel 305b, and blue sub-pixel 305c. In some examples, each subpixel may have an aspect ratio of approximately 1:3 (e.g., width:height) and may form an overall pixel that is substantially square. However, in other examples, the overall pixel shape may be rectangular (e.g., having unequal horizontal and vertical sampling pitches), hexagonal, or of another other suitable geometric shape. As shown in FIG. 3A, pixel 305 and sub-pixels 305a, 305b, and 305c are formed in a concave-hexagonal shape. In other examples, more or fewer subpixels may form an overall pixel. For example, a pixel may comprise four subpixels, such as in RGBW or RGBY configurations. In such examples, each subpixel may have an aspect ratio of approximately 1:4 in order to form an overall pixel that is substantially square, or may form an overall pixel with any suitable shape.

A plurality of pixels 305 may be substantially aligned (e.g., within 5°) to vertical axis 310 of pixel array 300. Five rows of pixels 305 are shown as a non-limiting example, aligned to vertical axis 310 along their vertical dimensions (e.g., lengths). Pixels 305 are further aligned to a horizontal axis 312 such that the pixels form a horizontally and vertically aligned grid, and, along with a plurality of additional pixels, form an underlying display as viewed in a direction substantially perpendicular to a plane of the display (e.g., along a direction extending into the page of FIG. 3A). Five columns of pixels 305 are shown as a non-limiting example. Horizontal axis 312, like vertical axis 310, may facilitate relative positioning and may not be defined relative to a fixed reference point (e.g., a point on Earth).

Pixels 305 are distributed horizontally at a spatial frequency $f_x$, and distributed vertically at a spatial frequency $f_y$. A horizontal pixel pitch ($1/f_x$), as used herein, refers to the horizontal distance (e.g., as measured along horizontal axis 312) between corresponding points of adjacent subpixels of the same color. For example, a horizontal pixel pitch 315 is shown, extending from midpoints of adjacent red sub-pixels, separated by a green sub-pixel and a blue sub-pixel. Similarly, a vertical pixel pitch ($1/f_y$), as used herein, refers to the vertical distance (e.g., as measured along vertical axis 310) between corresponding points of adjacent rows of pixels. For example, a vertical pixel pitch 317 is shown extending from the midpoints of adjacent rows of pixels.

Figure 3B:
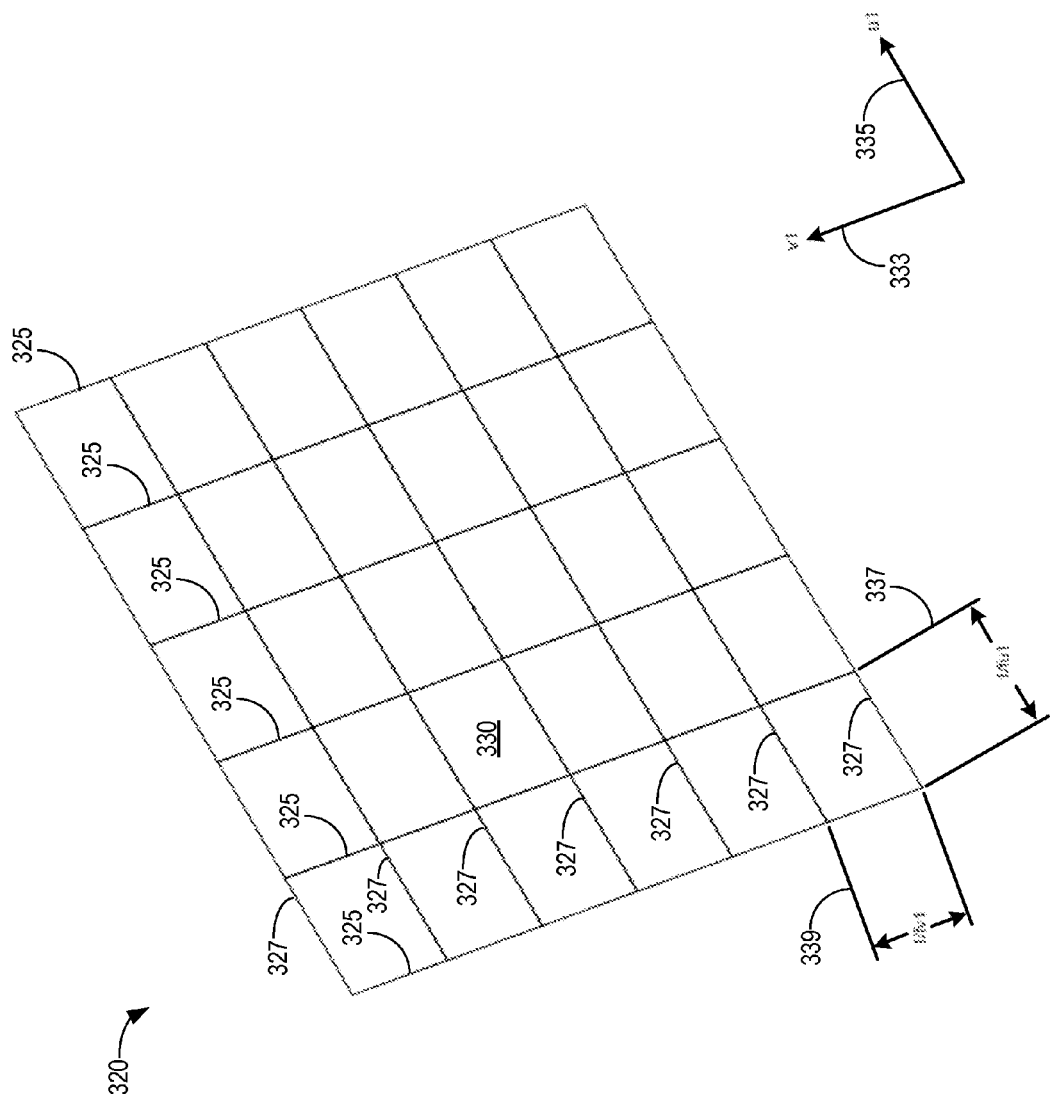
FIG. 3B shows a schematic top view of a metal mesh for a receive electrode matrix in accordance with the present disclosure.

FIG. 3B shows an example receive electrode mesh 320. Receive electrode mesh 320 includes a plurality of primary receive conductors 325 and secondary receive conductors 327 that may be positioned in receive electrode layer 210, the receive electrode layer positioned vertically above display stack 214. As non-limiting examples, the width of primary receive conductors 325 and secondary receive conductors 327 may be less than 3%, 2%, or 1.5% of horizontal pixel pitch 315 in respective embodiments. Primary receive conductors 325 and secondary receive conductors 327 may form a grid of openings 330.

A plurality of primary receive conductors 325 may be substantially aligned (e.g., within 5°) along direction 333 (direction $v_1$). Six primary receive conductors are shown as a non-limiting example. A plurality of secondary receive conductors 327 may be substantially aligned (e.g., within 5°) along direction 335 (direction $u_1$). Six secondary receive conductors are shown as a non-limiting example.

Primary receive conductors 325 may be periodically placed at a spatial frequency $f_{u1}$, while secondary receive conductors 327 may be periodically placed at spatial frequency $f_{v1}$. This conformation yields a periodic mesh having openings 330 that are periodic along directions $u_1$ and $v_1$. Openings 330 are distributed along direction $u_1$ with a primary pitch 337 of $1/f_{u1}$, and along direction $v_1$ with a secondary pitch 339 of $1/f_{v1}$.

Figure 3C:
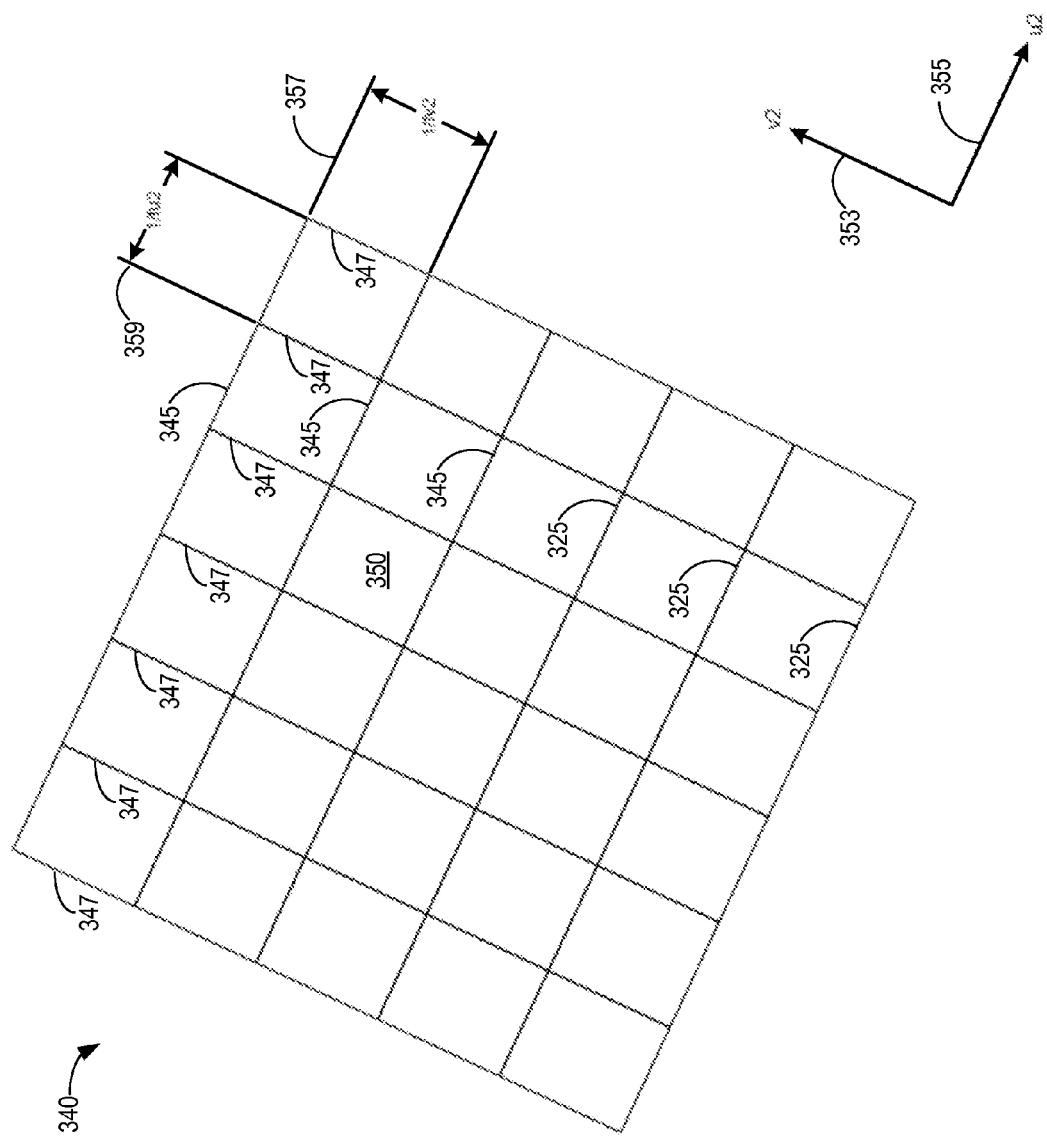
FIG. 3C shows a schematic top view of a metal mesh for a transmit electrode matrix in accordance with the present disclosure.

FIG. 3C shows an example transmit electrode mesh 340. Transmit electrode mesh 340 includes a plurality of primary transmit conductors 345 and secondary transmit conductors 347 that may be positioned in transmit electrode layer 212. As non-limiting examples, the width of primary transmit conductors 345 and secondary transmit conductors 347 may be less than 3%, 2%, or 1.5% of horizontal pixel pitch 315 in respective embodiments. Primary transmit conductors 345 and secondary transmit conductors 347 may form a grid of openings 350.

A plurality of primary transmit conductors 345 may be substantially aligned (e.g., within 5°) along direction 353 (direction $v_2$). Six primary transmit conductors are shown as a non-limiting example. A plurality of secondary transmit conductors 347 may be substantially aligned (e.g., within 5°) along direction 355 (direction $u_2$). Six secondary transmit conductors are shown as a non-limiting example.

Primary transmit conductors 345 may be periodically placed at a spatial frequency $f_{u2}$, while secondary transmit conductors 347 may be periodically placed at spatial frequency $f_{v2}$. This conformation yields a periodic mesh having openings 350 that are periodic along directions $u_2$ and $v_2$. Openings 350 are distributed along direction $u_2$ with a primary pitch 357 of $1/f_{u2}$, and along direction $v_2$ with a secondary pitch 359 of $1/f_{v2}$.

Figure 3D:
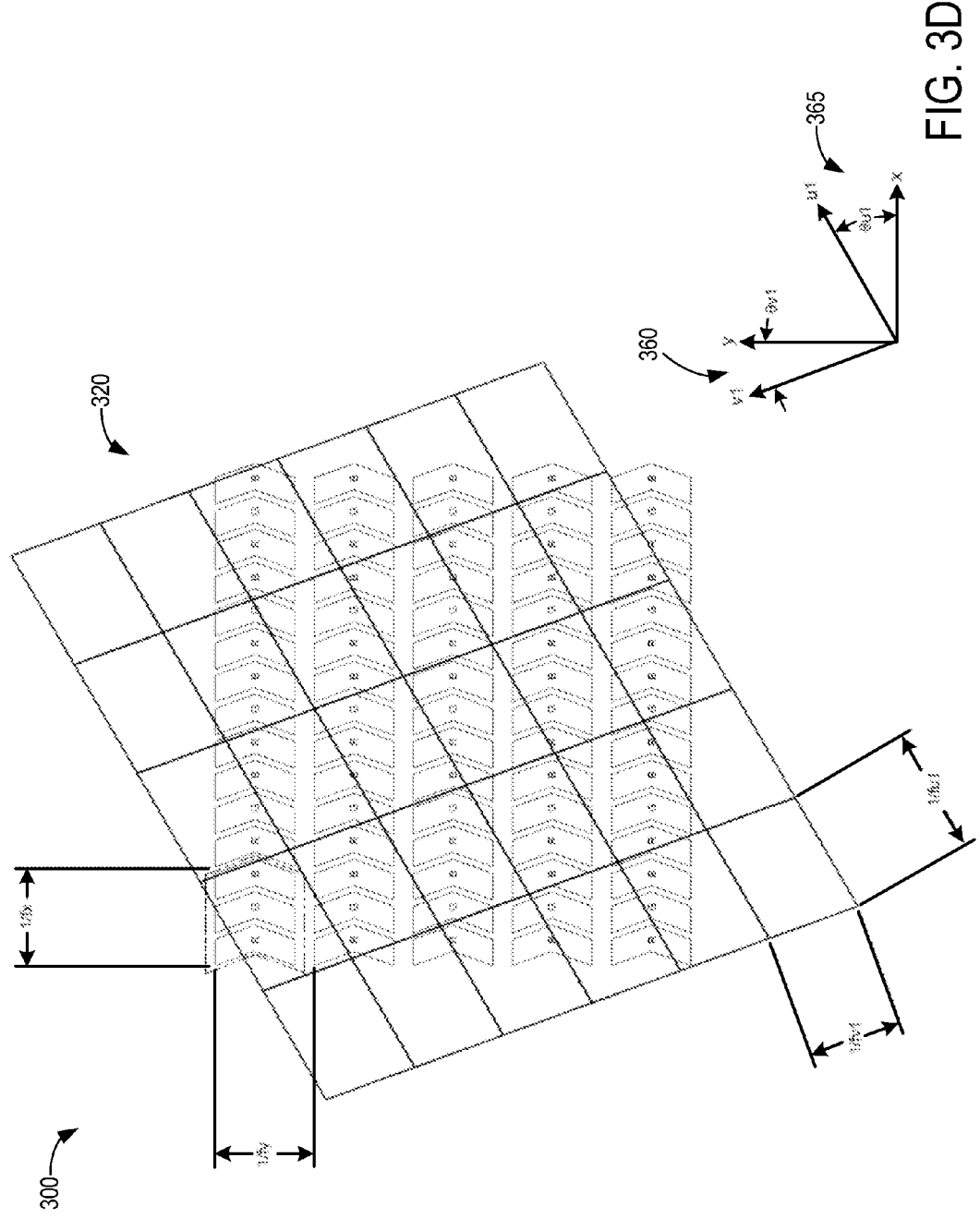
FIG. 3D shows a schematic top view of a metal mesh for a receive electrode matrix overlaid on a pixel array in accordance with the present disclosure.

FIG. 3D shows receive electrode mesh 320 overlaid on pixel array 300. Direction 333 ($v_1$) is displaced from vertical axis 310 (y) at an oblique angle 360 ($\theta_{v1}$). Direction 335 ($u_1$) is displaced from horizontal axis 312 (x) at an oblique angle 365 ($\theta_{u2}$). Similarly, FIG. 3E shows transmit electrode mesh 340 overlaid on pixel array 300. Direction 353 ($v_2$) is displaced from vertical axis 310 (y) at an oblique angle 370 ($\theta_{v2}$). Direction 355 ($u_2$) is displaced from horizontal axis 312 (x) at an oblique angle 365 ($\theta_2$). FIG. 3F shows both transmit electrode mesh 340 and receive electrode mesh 320 overlaid on pixel array 300.

In order to minimize moiré perceptibility, the spatial frequencies $\{f_{u1}, f_{v1}, f_{u2}, f_{v2}\}$ and directions of periodicity $\{\theta_{u1}, \theta_{v1}, \theta_{u2}, \theta_{v2}\}$ of the meshes (herein "mesh parameters") are the primary free parameters available for adjustment for a given pixel array. There are several practical difficulties in optimizing these parameters. First, because there has not been an adequate theory for analytically searching this eight-dimensional parameter space for optimal solutions, display system designers have to date searched the parameter space empirically, by visually assessing candidate meshes in superposition with a display panel. Second, the ranges of possible values for each parameter are broad. Each direction of periodicity may potentially vary over 0-45°, while each spatial frequency may potentially vary by several factors. Third, the locations of optimal solutions within the eight-parameter space are sensitive to the shapes and spatial frequencies of the display pixels. These differ between display models, and frequently change due to rapid evolution of display technology, requiring frequent and laborious re-optimization of mesh parameters. It is thus highly desirable to identify regions of the parameter space that are most likely to contain optimal solutions.

The superposition of periodic structures in two or more parallel, non-coincident planes produces a moiré image that, when viewed from a direction normal to those planes, is indistinguishable from the moiré image produced by a coplanar superposition of those structures. A set of mesh parameters that produces unacceptable moirés in a coplanar superposition will therefore produce unacceptable moirés in a non-coplanar superposition, as well as moirés not found in the coplanar superposition that may be unacceptable. Thus, even though the display pixels, receive electrode mesh, and transmit electrode mesh lie in different planes, regions of the parameter space that would produce unacceptable moirés if these structures were coplanar are likely to do so in non-coplanar superposition, and may be excluded from consideration. Regions of the parameter space that produce unacceptable moirés in the two-structure non-coplanar superpositions shown in FIGS. 3D and 3E, may also be excluded from consideration.

The four-parameter space for the two-structure superpositions shown in FIGS. 3D and 3E ($f_u$, $f_v$, $\theta_u$, $\theta_v$) contains a finite number of points which correspond to a local minimum of moiré perceptibility. In examples wherein the display pixels are square (i.e. $f_x = f_y = f$), and each comprises three primary-colored subpixels (red, green, and blue), these points satisfy all of the following criteria:

1. Each of $|\tan \theta_u|$ and $|\tan \theta_v|$ lies within one of the following ranges: 0.26-0.28, 0.38-0.48, 0.52-0.56, 0.59-0.62, 0.7-0.8.

2. $[f/(f_u * \cos \theta_u)]$ lies within one of the following ranges, where n is a positive integer:
   a. (n/3−1/4)−(n/3−1/12), if $|\tan \theta_u|$ lies within 0.26-0.28;
   b. (n/3+1/12)−(n13+1/4), if $|\tan \theta_u|$ lies within 0.38-0.48;
   c. (n/2−1/3)−(n/2−1/6), if $|\tan \theta_u|$ lies within 0.52-0.56;
   d. (n/3−1/3)−(n/3−1/6), if $|\tan \theta_u|$ lies within 0.59-0.62;
   e. (n/3−1/6)−(n/3), if $|\tan \theta_u|$ lies within 0.7-0.8.

3. $[f/(f_v * \cos \theta_v)]$ lies within one of the following ranges, where n is a positive integer:
   a. (n/3−1/4)−(n/3−1/12), if $|\tan \theta_u|$ lies within 0.26-0.28;
   b. (n/3+1/12)−(n/3+1/4), if $|\tan \theta_u|$ lies within 0.38-0.48;
   c. (n/2−1/3)−(n/2−1/6), if $|\tan \theta_u|$ lies within 0.52-0.56;
   d. (n/3−1/3)−(n/3−1/6), if $|\tan \theta_u|$ lies within 0.59-0.62;
   e. (n/3−1/6)−(n/3), if $|\tan \theta_u|$ lies within 0.7-0.8.

Manufacturing a display device utilizing points in this four parameter space falling outside of these ranges will give rise to visibly perceptible moiré patterns on the display surface, which may occlude underlying display images.

More generally, for a display device comprising display pixels that are periodic along two orthogonal directions x and y at spatial frequencies $f_x$ and $f_y$, respectively, an array of touch sensing electrodes, each comprising a metal mesh having openings that are periodic along a first direction $u_1$ at angle $\theta_{u1}$ relative to x, and a second direction $v_1$ at angle $\theta_{v1}$ relative to y, at spatial frequencies $f_{u1}$ and $f_{v1}$, respectively, may be overlaid on the display pixels while demonstrating a local minimum of moiré perceptibility provided the following criteria are met:

a. $|\tan \theta_{u1}|$ is within the range of 0.26 to 0.28, and $|f_x/(f_{u1}*\cos \theta_{u1})|$ is within 1/12 of $(m_1/3-1/6)$, where $m_1$ is a positive integer; or b. $|\tan \theta_{u1}|$ is within the range of 0.38 to 0.48, and $|f_x/(f_{u1}*\cos \theta_{u1})|$ is within 1/12 of $(m_1/3+1/6)$; or c. $|\tan \theta_{u1}|$ is within the range of 0.52 to 0.56, and $|f_x/(f_{u1}*\cos \theta_{u1})|$ is within 1/12 of $(m_1/2-1/4)$; or d. $|\tan \theta_{u1}|$ is within the range of 0.59 to 0.62, and $|f_x/(f_{u1}*\cos \theta_{u1})|$ is within 1/12 of $(m_1/3-1/4)$; or e. $|\tan \theta_{u1}|$ is within the range of 0.7 to 0.8, and $|f_x/(f_{u1}*\cos \theta_{u1})|$ is within 1/12 of $(m_1/3-1/12)$;

and f. $|\tan \theta_{v1}|$ is within the range of 0.26 to 0.28, and $|f_y/(f_{v1}*\cos \theta_{v1})|$ is within 1/12 of $(n_1/3-1/6)$, where $n_1$ is a positive integer; or g. $|\tan \theta_{v1}|$ is within the range of 0.38 to 0.48, and $|f_y/(f_{v1}*\cos \theta_{v1})|$ is within 1/12 of $(n_1/3+1/6)$; or h. $|\tan \theta_{v1}|$ is within the range of 0.52 to 0.56, and $|f_y/(f_{v1}*\cos \theta_{v1})|$ is within 1/12 of $(n_1/2-1/4)$; or i. $|\tan \theta_{v1}|$ is within the range of 0.59 to 0.62, and $|f_y/(f_{v1}*\cos \theta_{v1})|$ is within 1/12 of $(n_1/3-1/4)$; or j. $|\tan \theta_{v1}|$ is within the range of 0.7 to 0.8, and $|f_y/(f_{v1}*\cos \theta_{v1})|$ is within 1/12 of $(n_1/3-1/12)$.

FIG. 3D shows an example of such a configuration. To overlay a second array of touch sensing electrodes, each comprising a metal mesh having openings that are periodic along a third direction $u_2$ at angle $\theta_{u2}$ relative to x, and a fourth direction $v_2$ at angle $\theta_{v2}$ relative to y, at spatial frequencies $f_{u2}$ and $f_{v2}$, respectively, a local minimum of moiré perceptibility may be established, provided the following criteria are met:

a. $|\tan \theta_{u2}|$ is within the range of 0.26 to 0.28, and $|f_x/(f_{u2}*\cos \theta_{u2})|$ is within 1/12 of $(m_2/3-1/6)$, where $m_2$ is a positive integer; or b. $|\tan \theta_{u2}|$ is within the range of 0.38 to 0.48, and $|f_x/(f_{u2}*\cos \theta_{u2})|$ is within 1/12 of $(m_2/3+1/6)$; or c. $|\tan \theta_{u2}|$ is within the range of 0.52 to 0.56, and $|f_x/(f_{u2}*\cos \theta_{u2})|$ is within 1/12 of $(m_2/2-1/4)$; or d. $|\tan \theta_{u2}|$ is within the range of 0.59 to 0.62, and $|f_x/(f_{u2}*\cos \theta_{u2})|$ is within 1/12 of $(m_2/3-1/4)$; or e. $|\tan \theta_{u2}|$ is within the range of 0.7 to 0.8, and $|f_x/(f_{u2}*\cos \theta_{u2})|$ is within 1/12 of $(m_2/3-1/12)$;

and f. $|\tan \theta_{v2}|$ is within the range of 0.26 to 0.28, and $|f_y/(f_{v2}*\cos \theta_{v2})|$ is within 1/12 of $(n_2/3-1/6)$, where $n_2$ is a positive integer; or g. $|\tan \theta_{v2}|$ is within the range of 0.38 to 0.48, and $|f_y/(f_{v2}*\cos \theta_{v2})|$ is within 1/12 of $(n_2/3+1/6)$; or h. $|\tan \theta_{v2}|$ is within the range of 0.52 to 0.56, and $|f_y/(f_{v2}*\cos \theta_{v2})|$ is within 1/12 of $(n_2/2-1/4)$; or i. $|\tan \theta_{v2}|$ is within the range of 0.59 to 0.62, and $|f_y/(f_{v2}*\cos \theta_{v2})|$ is within 1/12 of $(n_2/3-1/4)$; or j. $|\tan \theta_{v2}|$ is within the range of 0.7 to 0.8, and $|f_y/(f_{v2}*\cos \theta_{v2})|$ is within 1/12 of $(n_2/3-1/12)$.

FIG. 3E shows an example of such a configuration. FIG. 3F shows the superposition of both transmit electrode mesh 340 and receive electrode mesh 320 overlaid on pixel array 300. In some examples, $n_1$ may not be equal to $n_2$, and $m_1$ may not be equal to $m_2$.

Figure 4:
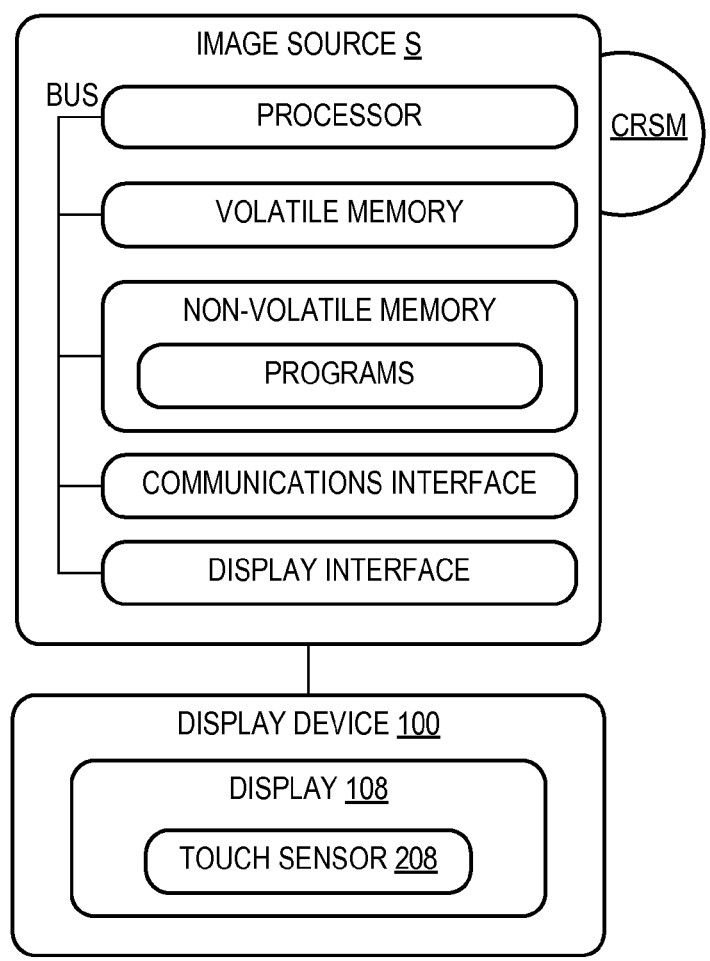
FIG. 4 is a schematic view of an image source for the display device of FIG. 1.

FIG. 4 illustrates an exemplary image source S according to one embodiment of the present invention. As discussed above, image source S may be an external computing device, such as a server, laptop computing device, set top box, game console, desktop computer, tablet computing device, mobile telephone, or other suitable computing device. Alternatively, image source S may be integrated within display device 100.

Image source S includes a processor, volatile memory, and non-volatile memory, such as mass storage, which is configured to store software programs in a non-volatile manner. The stored programs are executed by the processor using portions of volatile memory. Input for the programs may be received via a variety of user input devices, including touch sensor 208 integrated with display 108 of display device 100. The input may be processed by the programs, and suitable graphical output may be sent to display device 100 via a display interface for display to a user.

The processor, volatile memory, and non-volatile memory may be formed of separate components, or may be integrated into a system on a chip, for example. Further the processor may be a central processing unit, a multi-core processor, an ASIC, system-on-chip, or other type of processor. In some embodiments, aspects of the processor, volatile memory and non-volatile memory may be integrated into devices such as field-programmable gate arrays (FPGAs), program- application-specific integrated circuits (PASIC/ASICs), program- and application-specific standard products (PSSP/ASSPs), system-on-a-chip (SOC) systems, and complex programmable logic devices (CPLDs), for example.

A communications interface may also be provided to communicate with other computing devices, such as servers, across local and wide area network connections, such as the Internet.

The non-volatile memory may include removable media and/or built-in devices. For example, non-volatile memory may include optical memory devices (e.g., CD, DVD, HD-DVD, Blu-Ray Disc, etc.), semiconductor memory devices (e.g., FLASH, EPROM, EEPROM, etc.) and/or magnetic memory devices (e.g., hard disk drive, floppy disk drive, tape drive, MRAM, etc.), among others.

Removable computer readable storage media (CRSM) may be provided, which may be used to store data and/or instructions executable to implement the methods and processes described herein. Removable computer-readable storage media may take the form of CDs, DVDs, HD-DVDs, Blu-Ray Discs, EEPROMs, and/or floppy disks, among others.

Although the non-volatile memory and CRSM are physical devices configured to hold instructions for a duration of time, typically even upon power down of the image source, in some embodiments, aspects of the instructions described herein may be propagated by a computer readable communication medium, such as the illustrated communications bus, in a transitory fashion by a pure signal (e.g., an electromagnetic signal, an optical signal, etc.) that is not held by a physical device for at least a finite duration.

The term "program" may be used to describe software firmware, etc. of the system that is implemented to perform one or more particular functions. In some cases, such a program may be instantiated via the processor executing instructions held by non-volatile memory, using portions of volatile memory. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

An example provides a display device, comprising an array of display pixels comprising display pixel apertures that are periodic along two orthogonal directions, x and y, at spatial frequencies $f_x$ and $f_y$, respectively, and a first array of electrodes overlaid on the array of display pixel apertures, the first array of electrodes comprised of a metal mesh having openings that are periodic along a first direction $u_1$ at an angle $\theta_{u1}$ relative to x, and along a second direction $v_1$ at an angle $\theta_{v1}$ relative to y, and at spatial frequencies $f_{u1}$ and $f_{v1}$, respectively, and wherein the parameter set $\{\theta_{u1}, f_x, f_{u1}\}$ full satisfies the following criteria: $|\tan \theta_{u1}|$ is within the range of 0.26 to 0.28, and $|f_x/(f_{u1}*\cos \theta_{u1})|$ is within 1/12 of $(m_1/3-1/6)$, where $m_1$ is a positive integer, or $|\tan \theta_{u1}|$ is within the range of 0.38 to 0.48, and $|f_x/(f_{u1}*\cos \theta_{u1})|$ is within 1/12 of $(m_1/3+1/6)$, or $|\tan \theta_{u1}|$ is within the range of 0.52 to 0.56, and $|f_x/(f_{u1}*\cos \theta_{u1})|$ is within 1/12 of $(m_1/2-1/4)$; or $|\tan \theta_{u1}|$ is within the range of 0.59 to 0.62, and $|f_x/(f_{u1}*\cos \theta_{u1})|$ is within 1/12 of $(m_1/3-1/4)$; or $|\tan \theta_{u1}|$ is within the range of 0.7 to 0.8, and $|f_x/(f_{u1}*\cos \theta_{u1})|$ is within 1/12 of $(m_1/3-1/12)$. In such an example, the parameter set $\{\theta_{v1}, f_y, f_{v1}\}$ may additionally or alternatively satisfy the following criteria: $|\tan \theta_{v1}|$ is within the range of 0.26 to 0.28, and $|f_y/(f_{v1}*\cos \theta_{v1})|$ is within 1/12 of $(n_1/3-1/6)$, where $n_1$ is a positive integer, or $|\tan \theta_{v1}|$ is within the range of 0.38 to 0.48, and $|f_y/(f_{v1}*\cos \theta_{v1})|$ is within 1/12 of $(n_1/3+1/6)$, or $|\tan \theta_{v1}|$ is within the range of 0.52 to 0.56, and $|f_y/(f_{v1}*\cos \theta_{v1})|$ is within 1/12 of $(n_1/2-1/4)$, or $|\tan \theta_{v1}|$ is within the range of 0.59 to 0.62, and $|f_y/(f_{v1}*\cos \theta_{v1})|$ is within 1/12 of $(n_1/3-1/4)$, or $|\tan \theta_{v1}|$ is within the range of 0.7 to 0.8, and $|f_y/(f_{v1}*\cos \theta_{v1})|$ is within 1/12 of $(n_1/3-1/12)$. In such an example, the metal mesh may additionally or alternatively have a square unit cell. In such an example, the electrodes may additionally or alternatively comprise capacitive touch sensor electrodes. In such an example, each display pixel may additionally or alternatively comprise three primary-colored subpixels. In such an example, the display device may additionally or alternatively be configured such that $f_x=f_y=f$, and x may additionally or alternatively be perpendicular to y. In such an example, each of $|\tan \theta_{u1}|$ and $|\tan \theta_{v1}|$ may additionally or alternatively lie within one of the following ranges: 0.26-0.28, 0.38-0.48, 0.52-0.56, 0.59-0.62, 0.7-0.8, while $[f/(f_{u1}*\cos \theta_{u1})]$ may additionally or alternatively lie within one of the following ranges, where $m_1$ is a positive integer:

a. $(m_1/3-1/4)-(m_1/3-1/12)$, if $|\tan \theta_{u1}|$ lies within 0.26-0.28;

b. $(m_1/3+1/12)-(m_1/3+1/4)$, if $|\tan \theta_{u1}|$ lies within 0.38-0.48;

c. $(m_1/2-1/3)-(m_1/2-1/6)$, if $|\tan \theta_{u1}|$ lies within 0.52-0.56;

d. $(m_1/3-1/3)-(m_1/3-1/6)$, if $|\tan \theta_{u1}|$ lies within 0.59-0.62;

e. $(m_1/3-1/6)-(m_1/3)$, if $|\tan \theta_{u1}|$ within 0.7-0.8.

Further, $[f/(f_{v1}*\cos \theta_{v1})]$ may additionally or alternatively lie within one of the following ranges, where $n_1$ is a positive integer:

f. $(n_1/3-1/4)-(n_1/3-1/12)$, if $|\tan \theta_{v1}|$ lies within 0.26-0.28;

g. $(n_1/3+1/12)-(n_1/3+1/4)$, if $|\tan \theta_{v1}|$ lies within 0.38-0.48;

h. $(n_1/2-1/3)-(n_1/2-1/6)$, if $|\tan \theta_{v1}|$ lies within 0.52-0.56;

i. $(n_1/3-1/3)-(n_1/3-1/6)$, if $|\tan \theta_{v1}|$ lies within 0.59-0.62; and j. $(n_1/3-1/6)-(n_1/3)$, if $|\tan \theta_{v1}|$ lies within 0.7-0.8.

In such an example, the display device may additionally or alternatively comprise a second array of electrodes overlaid on the first array of electrodes, the second array of electrodes comprised of a metal mesh having openings that are periodic along a third direction $u_2$ at an angle $\theta_{u2}$ relative to x, and along a fourth direction $v_2$ at an angle $\theta_{v2}$ relative to y, and at spatial frequencies $f_{u2}$ and $f_{v2}$, respectively, and wherein the parameter set $\{\theta_{u2}, f_x, f_{u2}\}$ satisfies the following criteria: $|\tan \theta_{u2}|$ is within the range of 0.26 to 0.28, and $|f_x/(f_{u2}*\cos \theta_{u2})|$ is within 1/12 of $(m_2/3-1/6)$, where $m_2$ is a positive integer, or $|\tan \theta_{u2}|$ is within the range of 0.38 to 0.48, and $|f_x/(f_{u2}*\cos \theta_{u2})|$ is within 1/12 of $(m_2/3+1/6)$, or $|\tan \theta_{u2}|$ is within the range of 0.52 to 0.56, and $|f_x/(f_{u2}*\cos \theta_{u2})|$ is within 1/12 of $(m_2/2-1/4)$, or $|\tan \theta_{u2}|$ is within the range of 0.59 to 0.62, and $|f_x/(f_{u2}*\cos \theta_{u2})|$ is within 1/12 of $(m_2/3-1/4)$, or $|\tan \theta_{u2}|$ is within the range of 0.7 to 0.8, and $|f_x/(f_{u2}*\cos \theta_{u2})|$ is within 1/12 of $(m_2/3-1/12)$. In such an example, the parameter set $\{\theta_{v2}, f_y, f_{v2}\}$ may additionally or alternatively satisfy the following criteria: $|\tan \theta_{v2}|$ is within the range of 0.26 to 0.28, and $|f_y/(f_{v2}*\cos \theta_{v2})|$ is within 1/12 of $(n_2/3-1/6)$, where $n_2$ is a positive integer, or $|\tan \theta_{v2}|$ is within the range of 0.38 to 0.48, and $|f_y/(f_{v2}*\cos \theta_{v2})|$ is within 1/12 of $(n_2/3+1/6)$, or $|\tan \theta_{v2}|$ is within the range of 0.52 to 0.56, and $|f_y/(f_{v2}*\cos \theta_{v2})|$ is within 1/12 of $(n_2/2-1/4)$, or $|\tan \theta_{v2}|$ is within the range of 0.59 to 0.62, and $|f_y/(f_{v2}*\cos \theta_{v2})|$ is within 1/12 of $(n_2/3-1/4)$, or $|\tan \theta_{v2}|$ is within the range of 0.7 to 0.8, and $|f_y/(f_{v2}*\cos \theta_{v2})|$ is within 1/12 of $(n_2/3-1/12)$. In such an example, the display device may additionally or alternatively be configured such that $n_1$ is not equal to $n_2$, and may additionally or alternatively be configured such that $m_1$ is not equal to $m_2$. Any or all of the above-described examples may be combined in any suitable manner in various implementations.

In another example, a method of manufacturing a touch-sensitive display device is provided, comprising overlaying a first array of electrodes on an array of display pixel apertures, the array of display pixels comprising display pixel apertures that are periodic along two orthogonal directions, x and y, at spatial frequencies $f_x$ and $f_y$, respectively, the first array of electrodes comprised of a metal mesh having openings that are periodic along a first direction $u_1$ at an angle $\theta_{u1}$ relative to x, and along a second direction $v_1$ at an angle $\theta_{v1}$ relative to y, and at spatial frequencies $f_{u1}$ and $f_{v1}$, respectively, such that the parameter set $\{\theta_{u1}, f_x, f_{u1}\}$ satisfies the following criteria: $|\tan \theta_{u1}|$ is within the range of 0.26 to 0.28, and $|f_x/(f_{u1}*\cos \theta_{u1})|$ is within 1/12 of $(m_1/3-1/6)$, where $m_1$ is a positive integer, or $|\tan \theta_{u1}|$ is within the range of 0.38 to 0.48, and $|f_x/(f_{u1}*\cos \theta_{u1})|$ is within 1/12 of $(m_1/3+1/6)$, or $|\tan \theta_{u1}|$ is within the range of 0.52 to 0.56, and $|f_x/(f_{u1}*\cos \theta_{u1})|$ is within 1/12 of $(m_1/2-1/4)$, or $|\tan \theta_{u1}|$ is within the range of 0.59 to 0.62, and $|f_x/(f_{u1}*\cos \theta_{u1})|$ is within 1/12 of $(m_1/3-1/4)$, or $|\tan \theta_{u1}|$ is within the range of 0.7 to 0.8, and $|f_x/(f_{u1}*\cos \theta_{u1})|$ is within 1/12 of $(m_1/3-1/12)$. In such an example, the first array of electrodes may additionally or alternatively be overlaid on the array of display pixel apertures such that the parameter set $\{\theta_{v1}, f_y, f_{v1}\}$ satisfies the following criteria: $|\tan \theta_{v1}|$ is within the range of 0.26 to 0.28, and $|f_y/(f_{v1}*\cos \theta_{v1})|$ is within 1/12 of $(n_1/3-1/6)$, where $n_1$ is a positive integer, or $|\tan \theta_{v1}|$ is within the range of 0.38 to 0.48, and $|f_y/(f_{v1}*\cos \theta_{v1})|$ is within 1/12 of $(n_1/3+1/6)$, or $|\tan \theta_{v1}|$ is within the range of 0.52 to 0.56, and $|f_y/(f_{v1}*\cos \theta_{v1})|$ is within 1/12 of $(n_1/2-1/4)$, or $|\tan \theta_{v1}|$ is within the range of 0.59 to 0.62, and $|f_y/(f_{v1}*\cos \theta_{v1})|$ is within 1/12 of $(n_1/3-1/4)$, or $|\tan \theta_{v1}|$ is within the range of 0.7 to 0.8, and $|f_y/(f_{v1}*\cos \theta_{v1})|$ is within 1/12 of $(n_1/3-1/12)$. In such an example, the metal mesh may additionally or alternatively a square unit cell. In such an example, the electrodes may additionally or alternatively comprise capacitive touch sensor electrodes. In such an example, each display pixel may additionally or alternatively comprise three primary-colored subpixels. In such an example, the touch-sensitive display device may additionally or alternatively be manufactured such that $f_x=f_y=f$. In such an example, the touch-sensitive display device may additionally or alternatively be manufactured such that each of $|\tan \theta_{u1}|$ and $|\tan \theta_{v1}|$ lie within one of the following ranges: 0.26-0.28, 0.38-0.48, 0.52-0.56, 0.59-0.62, 0.7-0.8, while $[f/(f_{u1}*\cos \theta_{u1})]$ may additionally or alternatively lie within one of the following ranges, where $m_1$ is a positive integer;

a. $(m_1/3-1/4)-(m_1/3-1/12)$, if $|\tan \theta_{u1}|$ lies within 0.26-0.28;

b. $(m_1/3+1/12)-(m_1/3+1/4)$, if $|\tan \theta_{u1}|$ lies within 0.38-0.48;

c. $(m_1/2-1/3)-(m_1/2-1/6)$, if $|\tan \theta_{u1}|$ lies within 0.52-0.56;

d. $(m_1/3-1/3)-(m_1/3-1/6)$, if $|\tan \theta_{u1}|$ lies within 0.59-0.62;

e. $(m_1/3-1/6)-(m_1/3)$, if $|\tan \theta_{u1}|$ lies within 0.7-0.8.

Further, $[f/(f_{v1}*\cos \theta_{v1})]$ may additionally or alternatively lie within one of the following ranges, where $n_1$ is a positive integer;

f. $(n_1/3-1/4)-(n_1/3-1/12)$, if $|\tan \theta_{v1}|$ lies within 0.26-0.28;

g. $(n_1/3+1/12)-(n_1/3+1/4)$, if $|\tan \theta_{v1}|$ lies within 0.38-0.48;

h. $(n_1/2-1/3)-(n_1/2-1/6)$, if $|\tan \theta_{v1}|$ lies within 0.52-0.56;

i. $(n_1/3-1/3)-(n_1/3-1/6)$, if $|\tan \theta_{v1}|$ lies within 0.59-0.62; and j. $(n_1/3-1/6)-(n_1/3)$, if $|\tan \theta_{v1}|$ lies within 0.7-0.8.

In such an example, the method may additionally or alternatively comprise overlaying a second array of electrodes on the first array of electrodes, the second array of electrodes comprised of a metal mesh having openings that are periodic along a third direction $u_2$ at an angle $\theta_{u2}$ relative to x, and along a fourth direction $v_2$ at an angle $\theta_{v2}$ relative to y, and at spatial frequencies $f_{u2}$ and $f_{v2}$, respectively, such that the parameter set $\{\theta_{u2}, f_x, f_{u2}\}$ satisfies the following criteria: $|\tan \theta_{u2}|$ is within the range of 0.26 to 0.28, and $|f_x/(f_{u2}*\cos \theta_{u2})|$ is within 1/12 of $(m_2/3-1/6)$, where $m_2$ is a positive integer, or $|\tan \theta_{u2}|$ is within the range of 0.38 to 0.48, and $|f_x/(f_{u2}*\cos \theta_{u2})|$ is within 1/12 of $(m_2/3+1/6)$, or $|\tan \theta_{u2}|$ is within the range of 0.52 to 0.56, and $|f_x/(f_{u2}*\cos \theta_{u2})|$ is within 1/12 of $(m_2/2-1/4)$, or $|\tan \theta_{u2}|$ is within the range of 0.59 to 0.62, and $|f_x/(f_{u2}*\cos \theta_{u2})|$ is within 1/12 of $(m_2/3-1/4)$, or $|\tan \theta_{u2}|$ is within the range of 0.7 to 0.8, and $|f_x/(f_{u2}*\cos \theta_{u2})|$ is within 1/12 of $(m_2/3-1/12)$. In such an example, the second array of electrodes may additionally or alternatively be overlaid on the array of display pixel apertures such that the parameter set $\{\theta_{v2}, f_y, f_{v2}\}$ satisfies the following criteria: $|\tan \theta_{v2}|$ is within the range of 0.26 to 0.28, and $|f_y/(f_{v2}*\cos \theta_{v2})|$ is within 1/12 of $(n_2/3-1/6)$, where $n_2$ is a positive integer, or $|\tan \theta_{v2}|$ is within the range of 0.38 to 0.48, and $|f_y/(f_{v2}*\cos \theta_{v2})|$ is within 1/12 of $(n_2/3+1/6)$, or $|\tan \theta_{v2}|$ is within the range of 0.52 to 0.56, and $|f_y/(f_{v2}*\cos \theta_{v2})|$ is within 1/12 of $(n_2/2-1/4)$, or $|\tan \theta_{v2}|$ is within the range of 0.59 to 0.62, and $|f_y/(f_{v2}*\cos \theta_{v2})|$ is within 1/12 of $(n_2/3-1/4)$, or $|\tan \theta_{v2}|$ is within the range of 0.7 to 0.8, and $|f_y/(f_{v2}*\cos \theta_{v2})|$ is within 1/12 of $(n_2/3-1/12)$. In such an example, the touch-sensitive display device may additionally or alternatively be manufactured such that $n_1$ is not equal to $n_2$, and may additionally or alternatively be manufactured such that $m_1$ is not equal to $m_2$. Any or all of the above-described examples may be combined in any suitable manner in various implementations.

In yet another example, a display device having a capacitive touch-sensitive sensor is provided, the display device comprising an array of display pixels comprising display pixel apertures that are periodic along two orthogonal directions, x and y, at spatial frequencies $f_x$ and $f_y$, respectively, a first array of electrodes overlaid on the array of display pixel apertures, the first array of electrodes comprised of a metal mesh having openings that are periodic along a first direction $u_1$ at an angle $\theta_{u1}$ relative to x, and along a second direction $v_1$ at an angle $\theta_{v1}$ relative to y, and at spatial frequencies $f_{u1}$ and $f_{v1}$, respectively, and such that the parameter set $\{\theta_{u1}, f_x, f_{u1}\}$ satisfies the following criteria: $|\tan \theta_{u1}|$ is within the range of 0.26 to 0.28, and $|f_x/(f_{u1}*\cos \theta_{u1})|$ is within 1/12 of $(m_1/3-1/6)$, where $m_1$ is a positive integer, or $|\tan \theta_{u1}|$ is within the range of 0.38 to 0.48, and $|f_x/(f_{u1}*\cos \theta_{u1})|$ is within 1/12 of $(m_1/3+1/6)$, or $|\tan \theta_{u1}|$ is within the range of 0.52 to 0.56, and $|f_x/(f_{u1}*\cos \theta_{u1})|$ is within 1/12 of $(m_1/2-1/4)$, or $|\tan \theta_{u1}|$ is within the range of 0.59 to 0.62, and $|f_x/(f_{u1}*\cos \theta_{u1})|$ is within 1/12 of $(m_1/3-1/4)$, or $|\tan \theta_{u1}|$ is within the range of 0.7 to 0.8, and $|f_x/(f_{u1}*\cos \theta_{u1})|$ is within 1/12 of $(m_1/3-1/12)$. The display device may additionally or alternatively be configured such that the parameter set $\{\theta_{v1}, f_y, f_{v1}\}$ satisfies the following criteria: $|\tan \theta_{v1}|$ is within the range of 0.26 to 0.28, and $|f_y/(f_{v1}*\cos \theta_{v1})|$ is within 1/12 of $(n_1/3-1/6)$, where $n_1$ is a positive integer, or $|\tan \theta_{v1}|$ is within the range of 0.38 to 0.48, and $|f_y/(f_{v1}*\cos \theta_{v1})|$ is within 1/12 of $(n_1/3+1/6)$, or $|\tan \theta_{v1}|$ is within the range of 0.52 to 0.56, and $|f_y/(f_{v1}*\cos \theta_{v1})|$ is within 1/12 of $(n_1/2-1/4)$, or $|\tan \theta_{v1}|$ is within the range of 0.59 to 0.62, and $|f_y/(f_{v1}*\cos \theta_{v1})|$ is within 1/12 of $(n_1/3-1/4)$, or $|\tan \theta_{v1}|$ is within the range of 0.7 to 0.8, and $|f_y/(f_{v1}*\cos \theta_{v1})|$ is within 1/12 of $(n_1/3-1/12)$. The display device may additionally or alternatively comprise a second array of electrodes overlaid on the first array of electrodes, the second array of electrodes comprised of a metal mesh having openings that are periodic along a third direction $u_2$ at an angle $\theta_{u2}$ relative to x, and along a fourth direction $v_2$ at an angle $\theta_{v2}$ relative to y, and at spatial frequencies $f_{u2}$ and $f_{v2}$, respectively, and such that the parameter set $\{\theta_{u2}, f_x, f_{u2}\}$ satisfies the following criteria: $|\tan \theta_{u2}|$ is within the range of 0.26 to 0.28, and $|f_x/(f_{u2}*\cos \theta_{u2})|$ is within 1/12 of $(m_2/3-1/6)$, where $m_2$ is a positive integer, or $|\tan \theta_{u2}|$ is within the range of 0.38 to 0.48, and $|f_x/(f_{u2}*\cos \theta_{u2})|$ is within 1/12 of $(m_2/3+1/6)$, or $|\tan \theta_{u2}|$ is within the range of 0.52 to 0.56, and $|f_x/(f_{u2}*\cos \theta_{u2})|$ is within 1/12 of $(m_2/2-1/4)$, or $|\tan \theta_{u2}|$ is within the range of 0.59 to 0.62, and $|f_x/(f_{u2}*\cos \theta_{u2})|$ is within 1/12 of $(m_2/3-1/4)$, or $|\tan \theta_{u2}|$ is within the range of 0.7 to 0.8, and $|f_x/(f_{u2}*\cos \theta_{u2})|$ is within 1/12 of $(m_2/3-1/12)$. The display device may additionally or alternatively be configured such that the parameter set $\{\theta_{v2}, f_y, f_{v2}\}$ satisfies the following criteria: $|\tan \theta_{v2}|$ is within the range of 0.26 to 0.28, and $|f_y/(f_{v2}*\cos \theta_{v2})|$ is within 1/12 of $(n_2/3-1/6)$, where $n_2$ is a positive integer, or $|\tan \theta_{v2}|$ is within the range of 0.38 to 0.48, and $|f_y/(f_{v2}*\cos \theta_{v2})|$ is within 1/12 of $(n_2/3+1/6)$, or $|\tan \theta_{v2}|$ is within the range of 0.52 to 0.56, and $|f_y/(f_{v2}*\cos \theta_{v2})|$ is within 1/12 of $(n_2/2-1/4)$, or $|\tan \theta_{v2}|$ is within the range of 0.59 to 0.62, and $|f_y/(f_{v2}*\cos \theta_{v2})|$ is within 1/12 of $(n_2/3-1/4)$, or $|\tan \theta_{v2}|$ is within the range of 0.7 to 0.8, and $|f_y/(f_{v2}*\cos \theta_{v2})|$ is within 1/12 of $(n_2/3-1/12)$. In such an example, the display device may additionally or alternatively be configured such that each display pixel comprises three primary-colored subpixels, $f_x=f_y=f$, each of $|\tan \theta_{u1}|$ and $|\tan \theta_{v1}|$ lies within one of the following ranges: 0.26-0.28, 0.38-0.48, 0.52-0.56, 0.59-

0.62, 0.7-0.8, [f/($f_{u1}$*cos $\theta_{u1}$)] lies within one of the following ranges, where n is a positive integer:
  a. (n/3−1/4)−(n/3−1/12), if |tan $\theta_{u1}$| lies within 0.26-0.28;
  b. (n/3+1/12)−(n/3+1/4), if |tan $\theta_{u1}$| lies within 0.38-0.48;
  c. (n/2−1/3)−(n/2−1/6), if |tan $\theta_{u1}$| lies within 0.52-0.56;
  d. (n/3−1/3)−(n/3−1/6), if |tan $\theta_{u1}$| lies within 0.59-0.62;
  e. (n/3−1/6)−(n/3), if |tan $\theta_{u1}$| lies within 0.7-0.8; and
[f/($f_{v1}$*cos $\theta_{v1}$)] lies within one of the following ranges, where n is a positive integer:
  f. (n/3−1/4)−(n/3−1/12), if |tan $\theta_{v1}$| lies within 0.26-0.28;
  g. (n/3+1/12)−(n/3+1/4), if |tan $\theta_{v1}$| lies within 0.38-0.48;
  h. (n/2−1/3)−(n/2−1/6), if |tan $\theta_{v1}$| lies within 0.52-0.56;
  i. (n/3−1/3)−(n/3−1/6), if |tan $\theta_{v1}$| lies within 0.59-0.62;
  j. (n/3−1/6)−(n/3), if |tan $\theta_{v1}$| lies within 0.7-0.8; and
each of |tan $\theta_{u2}$| and |tan $\theta_{v2}$| lies within one of the following ranges: 0.26-0.28, 0.38-0.48, 0.52-0.56, 0.59-0.62, 0.7-0.8, [f/($f_{u2}$*cos $\theta_{u2}$)] lies within one of the following ranges, where n is a positive integer:
  k. (n/3−1/4)−(n/3−1/12), if |tan $\theta_{u2}$| lies within 0.26-0.28;
  l. (n/3+1/12)−(n/3+1/4), if |tan $\theta_{u2}$| lies within 0.38-0.48;
  m. (n/2−1/3)−(n/2−1/6), if |tan $\theta_{u2}$| lies within 0.52-0.56;
  n. (n/3−1/3)−(n/3−1/6), if |tan $\theta_{u2}$| lies within 0.59-0.62;
  o. (n/3−1/6)−(n/3), if |tan $\theta_{u2}$| lies within 0.7-0.8; and
[f/($f_{v2}$*cos $\theta_{v2}$)] lies within one of the following ranges, where n is a positive integer:
  p. (n/3−1/4)−(n/3−1/12), if |tan $\theta_{v2}$| lies within 0.26-0.28;
  q. (n/3+1/12)−(n/3+1/4), if |tan $\theta_{v2}$| lies within 0.38-0.48;
  r. (n/2−1/3)−(n/2−1/6), if |tan $\theta_{v2}$| lies within 0.52-0.56;
  s. (n/3−1/3)−(n/3−1/6), if |tan $\theta_{v2}$| lies within 0.59-0.62; and
  t. (n/3−1/6)−(n/3), if |tan $\theta_{v2}$| lies within 0.7-0.8. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device, comprising:
an array of display pixels comprising display pixel apertures that are periodic along two orthogonal directions, x and y, at spatial frequencies $f_x$ and $f_y$, respectively; and
a first array of electrodes overlaid on the array of display pixel apertures, the first array of electrodes comprised of a metal mesh having conductors with a width that is less than 3% of a pixel pitch of the array of display pixels, the metal mesh having openings formed between the conductors that are periodic along a first direction $u_1$ at an angle $\theta_{u1}$ relative to x, and along a second direction $v_1$ at an angle $\theta_{v1}$ relative to y, and at spatial frequencies $f_{u1}$ and $f_{v1}$, respectively, and wherein the parameter set {$\theta_{u1}$, $f_x$, $f_{u1}$} satisfies the following criteria:

|tan $\theta_{u1}$| is within the range of 0.26 to 0.28, and |$f_x$/($f_{u1}$*cos $\theta_{u1}$)| is within 1/12 of ($m_1$/3−1/6), where $m_1$ is a positive integer; or
|tan $\theta_{u1}$| is within the range of 0.38 to 0.48, and |$f_x$/($f_{u1}$*cos $\theta_{u1}$)| is within 1/12 of ($m_1$/3+1/6); or
|tan $\theta_{u1}$| is within the range of 0.52 to 0.56, and |$f_x$/($f_{u1}$*cos $\theta_{u1}$)| is within 1/12 of ($m_1$/2−1/4); or
|tan $\theta_{u1}$| is within the range of 0.59 to 0.62, and |$f_x$/($f_{u1}$*cos $\theta_{u1}$)| is within 1/12 of ($m_1$/3−1/4); or
|tan $\theta_{u1}$| is within the range of 0.7 to 0.8, and |$f_x$/($f_{u1}$*cos $\theta_{u1}$)| is within 1/12 of ($m_1$/3−1/12).

2. The display device of claim 1, wherein the parameter set {$\theta_{v1}$, $f_y$, $f_{v1}$} satisfies the following criteria:
|tan $\theta_{v1}$| is within the range of 0.26 to 0.28, and |$f_y$/($f_{v1}$*cos $\theta_{v1}$)| is within 1/12 of ($n_1$/3−1/6), where $n_1$ is a positive integer; or
|tan $\theta_{v1}$| is within the range of 0.38 to 0.48, and |$f_y$/($f_{v1}$*cos $\theta_{v1}$)| is within 1/12 of ($n_1$/3+1/6); or
|tan $\theta_{v1}$| is within the range of 0.52 to 0.56, and |$f_y$/($f_{v1}$*cos $\theta_{v1}$)| is within 1/12 of ($n_1$/2−1/4); or
|tan $\theta_{v1}$| is within the range of 0.59 to 0.62, and |$f_y$/($f_{v1}$*cos $\theta_{v1}$)| is within 1/12 of ($n_1$/3−1/4); or
|tan $\theta_{v1}$| is within the range of 0.7 to 0.8, and |$f_y$/($f_{v1}$*cos $\theta_{v1}$)| is within 1/12 of ($n_1$/3−1/12).

3. The display device of claim 2, further comprising:
a second array of electrodes overlaid on the first array of electrodes, the second array of electrodes comprised of a metal mesh having openings that are periodic along a third direction $u_2$ at an angle $\theta_{u2}$ relative to x, and along a fourth direction $v_2$ at an angle $\theta_{v2}$ relative to y, and at spatial frequencies $f_{u2}$ and $f_{v2}$, respectively, and wherein the parameter set {$\theta_2$, $f_x$, $f_{u2}$} satisfies the following criteria:
|tan $\theta_{u2}$| is within the range of 0.26 to 0.28, and |$f_x$/($f_{u2}$*cos $\theta_{u2}$)| is within 1/12 of ($m_2$/3−1/6), where $m_2$ is a positive integer; or
|tan $\theta_{u2}$| is within the range of 0.38 to 0.48, and |$f_x$/($f_{u2}$*cos $\theta_{u2}$)| is within 1/12 of ($m_2$/3+1/6); or
|tan $\theta_{u2}$| is within the range of 0.52 to 0.56, and |$f_x$/($f_2$*cos $\theta_{u2}$)| is within 1/12 of ($m_2$/2−1/4); or
|tan $\theta_{u2}$| is within the range of 0.59 to 0.62, and |$f_x$/($f_{u2}$*cos $\theta_{u2}$)| is within 1/12 of ($m_2$/3−1/4); or
|tan $\theta_{u2}$| is within the range of 0.7 to 0.8, and |$f_x$/($f_{u2}$*cos $\theta_{u2}$)| is within 1/12 of ($m_2$/3−1/12); and
wherein the parameter set {$\theta_{v2}$, $f_y$, $f_{v2}$} satisfies the following criteria:
|tan $\theta_{v2}$| is within the range of 0.26 to 0.28, and |$f_y$/($f_2$*cos $\theta_{v2}$)| is within 1/12 of ($n_2$/3−1/6), where $n_2$ is a positive integer; or
|tan $\theta_{v2}$| is within the range of 0.38 to 0.48, and |$f_y$/($f_2$*cos $\theta_{v2}$)| is within 1/12 of ($n_2$/3+1/6); or
|tan $\theta_{v2}$| is within the range of 0.52 to 0.56, and |$f_y$/($f_2$*cos $\theta_{v2}$)| is within 1/12 of ($n_2$/2−1/4); or
|tan $\theta_{v2}$| is within the range of 0.59 to 0.62, and |$f_y$/($f_{v2}$*cos $\theta_{v2}$)| is within 1/12 of ($n_2$/3−1/4); or
|tan $\theta_{v2}$| is within the range of 0.7 to 0.8, and |$f_y$/($f_{v2}$*cos $\theta_{v2}$)| is within 1/12 of ($n_2$/3−1/12).

4. The display device of claim 3, wherein $n_1$ is not equal to $n_2$, and further wherein $m_1$ is not equal to $m_2$.

5. The display device of claim 1, wherein the metal mesh has a square unit cell.

6. The display device of claim 1, wherein the electrodes comprise capacitive touch sensor electrodes.

7. The display device of claim 1, wherein each display pixel comprises three primary-colored subpixels.

8. The display device of claim 7, wherein $f_x$=$f_y$=f, and wherein x is perpendicular to y.

9. The display device of claim 8, wherein:
each of $|\tan \theta_{u1}|$ and $|\tan \theta_{v1}|$ lies within one of the following ranges: 0.26-0.28, 0.38-0.48, 0.52-0.56, 0.59-0.62, 0.7-0.8;
$[f/(f_{u1}*\cos \theta_{u1})]$ lies within one of the following ranges, where $m_1$ is a positive integer:
 a. $(m_1/3-1/4)-(m_1/3-1/12)$, if $|\tan \theta_{u1}|$ lies within 0.26-0.28;
 b. $(m_1/3+1/2)-(m_1/3+1/4)$, if $|\tan \theta_{u1}|$ lies within 0.38-0.48;
 c. $(m_1/2-1/3)-(m_1/2-1/6)$, if $|\tan \theta_{u1}|$ lies within 0.52-0.56;
 d. $(m_1/3-1/3)-(m_1/3-1/6)$, if $|\tan \theta_{u1}|$ lies within 0.59-0.62;
 e. $(m_1/3-1/6)-(m_1/3)$, if $|\tan 74_{u1}|$ lies within 0.7-0.8; and
$[f/(f_{v1}*\cos \theta_{v1})]$ lies within one of the following ranges, where $n_1$ is a positive integer:
 f. $(n_1/3-1/4)-(n_1/3-1/12)$, if $|\tan \theta_{v1}|$ lies within 0.26-0.28;
 g. $(n_1/3+1/12)-(n_1/3+1/4)$, if $|\tan \theta_{v1}|$ lies within 0.38-0.48;
 h. $(n_1/2-1/3)-(n_1/2-1/6)$, if $|\tan \theta_{v1}|$ lies within 0.52-0.56;
 i. $(n_1/3-1/3)-(n_1/3-1/6)$, if $|\tan \theta_{v1}|$ lies within 0.59-0.62; and
 j. $(n_1/3-1/6)-(n_1/3)$, if $|\tan \theta_{v1}|$ lies within 0.7-0.8.

10. A method of manufacturing a touch-sensitive display device, comprising:
overlaying a first array of electrodes on an array of display pixel apertures, the array of display pixels comprising display pixel apertures that are periodic along two orthogonal directions, x and y, at spatial frequencies $f_x$ and $f_y$, respectively, the first array of electrodes comprised of a metal mesh having conductors with a width that is less than 3% of a pixel pitch of the array of display pixels, the metal mesh having openings formed between the conductors that are periodic along a first direction $u_1$ at an angle $\theta_{u1}$ relative to x, and along a second direction $v_1$ at an angle $\theta_{v1}$ relative to y, and at spatial frequencies $f_{u1}$ and $f_{v1}$, respectively, such that the parameter set $\{\theta_{u1}, f_x, f_{u1}\}$ satisfies the following criteria:
$|\tan \theta_{u1}|$ is within the range of 0.26 to 0.28, and $|f_x/(f_{u1}*\cos \theta_{u1})|$ is within 1/12 of $(m_1/3-1/6)$, where $m_1$ is a positive integer; or
$|\tan \theta_{u1}|$ is within the range of 0.38 to 0.48, and $|f_x/(f_{u1}*\cos \theta_{u1})|$ is within 1/12 of $(m_1/3+1/6)$; or
$|\tan \theta_{u1}|$ is within the range of 0.52 to 0.56, and $|f_x/(f_{u1}*\cos \theta_{u1})|$ is within 1/12 of $(m_1/2-1/4)$; or
$|\tan \theta_{u1}|$ is within the range of 0.59 to 0.62, and $|f_x/(f_{u1}*\cos \theta_{u1})|$ is within 1/12 of $(m_1/3-1/4)$; or
$|\tan \theta_{u1}|$ is within the range of 0.7 to 0.8, and $|f_x/(f_{u1}*\cos \theta_{u1})|$ is within 1/12 of $(m_1/3-1/12)$.

11. The method of claim 10, wherein the first array of electrodes is overlaid on the array of display pixel apertures such that the parameter set $\{\theta_{v1}, f_y, f_{v1}\}$ satisfies the following criteria:
$|\tan \theta_{v1}|$ is within the range of 0.26 to 0.28, and $|f_y/(f_{v1}*\cos \theta_{v1})|$ is within 1/12 of $(n_1/3-1/6)$, where $n_1$ is a positive integer; or
$|\tan \theta_{v1}|$ is within the range of 0.38 to 0.48, and $|f_y/(f_{v1}*\cos \theta_{v1})|$ is within 1/12 of $(n_1/3+1/6)$; or
$|\tan \theta_{v1}|$ is within the range of 0.52 to 0.56, and $|f_y/(f_{v1}*\cos \theta_{v1})|$ is within 1/12 of $(n_1/2-1/4)$; or
$|\tan \theta_{v1}|$ is within the range of 0.59 to 0.62, and $|f_y/(f_{v1}*\cos \theta_{v1})|$ is within 1/12 of $(n_1/3-1/4)$; or
$|\tan \theta_{v1}|$ is within the range of 0.7 to 0.8, and $|f_y/(f_{v1}*\cos \theta_{v1})|$ is within 1/12 of $(n_1/3-1/12)$.

12. The method of claim 11, further comprising:
overlaying a second array of electrodes on the first array of electrodes, the second array of electrodes comprised of a metal mesh having openings that are periodic along a third direction $u_2$ at an angle $\theta_{u2}$ relative to x, and along a fourth direction $v_2$ at an angle $\theta_{v2}$ relative to y, and at spatial frequencies $f_{u2}$ and $f_{v2}$, respectively, such that the parameter set $\{\theta_{u2}, f_x, f_{u2}\}$ satisfies the following criteria:
$|\tan \theta_{u2}|$ is within the range of 0.26 to 0.28, and $|f_x/(f_{u2}*\cos \theta_{u2})|$ is within 1/12 of $(m_2/3-1/6)$, where $m_2$ is a positive integer; or
$|\tan \theta_{u2}|$ is within the range of 0.38 to 0.48, and $|f_x/(f_{u2}*\cos \theta_{u2})|$ is within 1/12 of $(m_2/3+1/6)$; or
$|\tan \theta_{u2}|$ is within the range of 0.52 to 0.56, and $|f_x/(f_{u2}*\cos \theta_{u2})|$ is within 1/12 of $(m_2/2-1/4)$; or
$|\tan \theta_{u2}|$ is within the range of 0.59 to 0.62, and $|f_x/(f_{u2}*\cos \theta_{u2})|$ is within 1/12 of $(m_2/3-1/4)$; or
$|\tan \theta_{u2}|$ is within the range of 0.7 to 0.8, and $|f_x/(f_2*\cos \theta_{u2})|$ is within 1/12 of $(m_2/3-1/12)$; and
such that the parameter set $\{\theta_{v2}, f_y, f_{v2}\}$ satisfies the following criteria:
$|\tan \theta_{v2}|$ is within the range of 0.26 to 0.28, and $|f_y/(f_{v2}*\cos \theta_{v2})|$ is within 1/12 of $(n_2/3-1/6)$, where $n_2$ is a positive integer; or
$|\tan \theta_{v2}|$ is within the range of 0.38 to 0.48, and $|f_y/(f_{v2}*\cos \theta_{v2})|$ is within 1/12 of $(n_2/3+1/6)$; or
$|\tan \theta_{v2}|$ is within the range of 0.52 to 0.56, and $|f_y/(f_{v2}*\cos \theta_{v2})|$ is within 1/12 of $(n_2/2-1/4)$; or
$|\tan \theta_{v2}|$ is within the range of 0.59 to 0.62, and $|f_y/(f_{v2}*\cos \theta_{v2})|$ is within 1/12 of $(n_2/3-1/4)$; or
$|\tan \theta_{v2}|$ is within the range of 0.7 to 0.8, and $|f_y/(f_{v2}*\cos \theta_{v2})|$ is within 1/12 of $(n_2/3-1/12)$.

13. The method of claim 12, wherein $n_1$ is not equal to $n_2$, and further wherein $m_1$ is not equal to $m_2$.

14. The method of claim 10, wherein the metal mesh has a square unit cell.

15. The method of claim 10, wherein the electrodes comprise capacitive touch sensor electrodes.

16. The method of claim 10, wherein each display pixel comprises three primary-colored subpixels.

17. The method of claim 16, wherein $f_x=f_y=f$.

18. The method of claim 17, wherein:
each of $|\tan \theta_{u1}|$ and $|\tan \theta_{v1}|$ lies within one of the following ranges: 0.26-0.28, 0.38-0.48, 0.52-0.56, 0.59-0.62, 0.7-0.8;
$[f/(f_{u1}*\cos \theta_{u1})]$ lies within one of the following ranges, where $m_1$ is a positive integer:
 a. $(m_1/3-1/4)-(m_1/3-1/12)$, if $|\tan \theta_{u1}|$ lies within 0.26-0.28;
 b. $(m_1/3+1/12)-(m_1/3+1/4)$, if $|\tan \theta_{u1}|$ lies within 0.38-0.48;
 c. $(m_1/2-1/3)-(m_1/2-1/6)$, if $|\tan \theta_{u1}|$ lies within 0.52-0.56;
 d. $(m_1/3-1/3)-(m_1/3-1/6)$, if $|\tan \theta_{u1}|$ lies within 0.59-0.62;
 e. $(m_1/3-1/6)-(m_1/3)$, if $|\tan \theta_{u1}|$ lies within 0.7-0.8; and
$[f/(f_{v1}*\cos \theta_{v1})]$ lies within one of the following ranges, where $n_1$ is a positive integer:
 f. $(n_1/3-1/4)-(n_1/3-1/12)$, if $|\tan \theta_{v1}|$ lies within 0.26-0.28;
 g. $(n_1/3+1/12)-(n_1/3+1/4)$, if $|\tan \theta_{v1}|$ lies within 0.38-0.48;

h. $(n_1/2-1/3)-(n_1/2-1/6)$, if $|\tan\theta_{v1}|$ lies within 0.52-0.56;

i. $(n_1/3-1/3)-(n_1/3-1/6)$, if $|\tan\theta_{v1}|$ lies within 0.59-0.62; and j. $(n1/3-1/6)-(n^1/3)$, if $|\tan\theta_{v1}|$ lies within 0.7-0.8.

19. A display device having a capacitive touch-sensitive sensor, the display device comprising:

an array of display pixels comprising display pixel apertures that are periodic along two orthogonal directions, x and y, at spatial frequencies $f_x$ and $f_y$, respectively;

a first array of electrodes overlaid on the array of display pixel apertures, the first array of electrodes comprised of a metal mesh having conductors with a width that is less than 3% of a pixel pitch of the array of display pixels, the metal mesh having openings formed between the conductors that are periodic along a first direction $u_1$ at an angle $\theta_{u1}$ relative to x, and along a second direction $v_1$ at an angle $\theta_{v1}$ relative to y, and at spatial frequencies $f_{u1}$ and $f_{v1}$, respectively, and wherein the parameter set $\{\theta_{u1}, f_x, f_{u1}\}$ satisfies the following criteria:

$|\tan\theta_{u1}|$ is within the range of 0.26 to 0.28, and $|f_x/(f_{u1}*\cos\theta_{u1})|$ is within 1/12 of $(m_1/3-1/6)$, where $m_1$ is a positive integer; or $|\tan\theta_{u1}|$ is within the range of 0.38 to 0.48, and $|f_x/(f_{u1}*\cos\theta_{u1})|$ is within 1/12 of $(m_1/3+1/6)$; or $|\tan\theta_{u1}|$ is within the range of 0.52 to 0.56, and $|f_x/(f_{u1}*\cos\theta_{u1})|$ is within 1/12 of $(m_1/2-1/4)$; or $|\tan\theta_{u1}|$ is within the range of 0.59 to 0.62, and $|f_x/(f_{u1}*\cos\theta_{u1})|$ is within 1/12 of $(m_1/3-1/4)$; or $|\tan\theta_{u1}|$ is within the range of 0.7 to 0.8, and $|f_x/(f_{u1}*\cos\theta_{u1})|$ is within 1/12 of $(m_1/3-1/12)$; and wherein the parameter set $\{\theta_{v1}, f_y, f_{v1}\}$ satisfies the following criteria:

$|\tan\theta_{v1}|$ is within the range of 0.26 to 0.28, and $|f_y/(f_{v1}*\cos\theta_{v1})|$ is within 1/12 of $(n_1/3-1/6)$, where $n_1$ is a positive integer; or $|\tan\theta_{v1}|$ is within the range of 0.38 to 0.48, and $|f_y/(f_{v1}*\cos\theta_{v1})|$ is within 1/12 of $(n_1/3+1/6)$; or $|\tan\theta_{v1}|$ is within the range of 0.52 to 0.56, and $|f_y/(f_{v1}*\cos\theta_{v1})|$ is within 1/12 of $(n_1/2-1/4)$; or $|\tan\theta_{v1}|$ is within the range of 0.59 to 0.62, and $|f_y/(f_{v1}*\cos\theta_{v1})|$ is within 1/12 of $(n_1/3-1/4)$; or $|\tan\theta_{v1}|$ is within the range of 0.7 to 0.8, and $|f_y/(f_{v1}*\cos\theta_{v1})|$ is within 1/12 of $(n_1/3-1/12)$; and a second array of electrodes overlaid on the first array of electrodes, the second array of electrodes comprised of a metal mesh having openings that are periodic along a third direction $u_2$ at an angle $\theta_{u2}$ relative to x, and along a fourth direction $v_{v2}$ at an angle $\theta_{v2}$ relative to y, and at spatial frequencies $f_{u2}$ and $f_{v2}$, respectively, and wherein the parameter set $\{\theta_{u2}, f_x, f_2\}$ satisfies the following criteria:

$|\tan\theta_{u2}|$ is within the range of 0.26 to 0.28, and $|f_x/(f_{u2}*\cos\theta_{u2})|$ is within 1/12 of $(m_2/3-1/6)$, where $m_2$ is a positive integer; or $|\tan\theta_{u2}|$ is within the range of 0.38 to 0.48, and $|f_x/(f_{u2}*\cos\theta_{u2})|$ is within 1/12 of $(m_2/3+1/6)$; or $|\tan\theta_{u2}|$ is within the range of 0.52 to 0.56, and $|f_x/(f_{u2}*\cos\theta_{u2})|$ is within 1/12 of $(m_2/2-1/4)$; or $|\tan\theta_{u2}|$ is within the range of 0.59 to 0.62, and $|f_x/(f_{u2}*\cos\theta_{u2})|$ is within 1/12 of $(m_2/3-1/4)$; or $|\tan\theta_{u2}|$ is within the range of 0.7 to 0.8, and $|f_x/(f_{u2}*\cos\theta_{u2})|$ is within 1/12 of $(m_2/3-1/12)$; and wherein the parameter set $\{\theta_{v2}, f_y, f_{v2}\}$ satisfies the following criteria:

$|\tan\theta_{v2}|$ is within the range of 0.26 to 0.28, and $|f_y1/12$ of $(n_2/3-1/6)$, where $n_2$ is a positive integer; or $|\tan\theta_{v2}|$ is within the range of 0.38 to 0.48, and $|f_y/(f_2*\cos\theta_{v2})|$ is within 1/12 of $(n_2/3+1/6)$; or $|\tan\theta_{v2}|$ is within the range of 0.52 to 0.56, and $|f_y/(f_{v2}*\cos\theta_{v2})|$ is within 1/12 of $(n_2/2-1/4)$; or $|\tan\theta_{v2}|$ is within the range of 0.59 to 0.62, and $|f_y/(f_{v2}*\cos\theta_{v2})|$ is within 1/12 of $(n_2/3-1/4)$; or $|\tan\theta_{v2}|$ is within the range of 0.7 to 0.8, and $|f_y/(f_{v2}*\cos\theta_{v2})|$ is within 1/12 of $(n_2/3-1/12)$.

20. The display device of claim 19, wherein each display pixel comprises three primary-colored subpixels;

$f_x=f_y=f$;

each of $|\tan\theta_{u1}|$ and $|\tan\theta_{v1}|$ lies within one of the following ranges: 0.26-0.28, 0.38-0.48, 0.52-0.56, 0.59-0.62, 0.7-0.8;

$[f/(f_{u1}*\cos\theta_{u1})]$ lies within one of the following ranges, where n is a positive integer:

a. $(n/3-1/4)-(n/3-1/12)$, if $|\tan$ within 0.26-0.28;

b. $(n/3+1/12)-(n/3+1/4)$, if $|\tan\theta_{u1}|$ lies within 0.38-0.48;

c. $(n/2-1/3)-(n/2-1/6)$, if $|\tan\theta_{u1}|$ lies within 0.52-0.56;

d. $(n/3-1/3)-(n/3-1/6)$, if $|\tan\theta_{u1}|$ lies within 0.59-0.62;

e. $(n/3-1/6)-(n/3)$, if $|\tan\theta_{u1}|$ lies within 0.7-0.8; and $[f/(f_{v1}*\cos\theta_{v1})]$ lies within one of the following ranges, where n is a positive integer:

f. $(n/3-1/4)-(n/3-1/12)$, if $|\tan\theta_{v1}|$ lies within 0.26-0.28;

g. $(n/3+1/12)-(n/3+1/4)$, if $|\tan\theta_{v1}|$ lies within 0.38-0.48;

h. $(n/2-1/3)-(n/2-1/6)$, if $|\tan\theta_{v1}|$ lies within 0.52-0.56;

i. $(n/3-1/3)-(n/3-1/6)$, if $|\tan\theta_{v1}|$ lies within 0.59-0.62;

j. $(n/3-1/6)-(n/3)$, if $|\tan\theta_{v1}|$ lies within 0.7-0.8; and each of $|\tan\theta_{u2}|$ and $|\tan\theta_{v2}|$ lies within one of the following ranges: 0.26-0.28, 0.38-0.48, 0.52-0.56, 0.59-0.62, 0.7-0.8;

$[f/(f_{u2}*\cos\theta_{u2})]$ lies within one of the following ranges, where n is a positive integer:

k. $(n/3-1/4)-(n/3-1/12)$, if $|\tan\theta_{u2}|$ lies within 0.26-0.28;

l. $(n/3+1/12)-(n/3+1/4)$, if $|\tan\theta_{u2}|$ lies within 0.38-0.48;

m. $(n/2-1/3)-(n/2-1/6)$, if $|\tan\theta_{u2}|$ lies within 0.52-0.56;

n. $(n/3-1/3)-(n/3-1/6)$, if $|\tan\theta_{u2}|$ lies within 0.59-0.62;

o. $(n/3-1/6)-(n/3)$, if $|\tan\theta_{u2}|$ lies within 0.7-0.8; and $[f/(f_{v2}*\cos\theta_{v2})]$ lies within one of the following ranges, where n is a positive integer:

p. $(n/3-1/4)-(n/3-1/12)$, if $|\tan\theta_{v2}|$ lies within 0.26-0.28;

q. $(n/3+1/12)-(n/3+1/4)$, if $|\tan\theta_{v2}|$ lies within 0.38-0.48;

r. $(n/2-1/3)-(n/2-1/6)$, if $|\tan\theta_{v2}|$ lies within 0.52-0.56;

s. $(n/3-1/3)-(n/3-1/6)$, if $|\tan\theta_{v2}|$ lies within 0.59-0.62; and t. $(n/3-1/6)-(n/3)$, if $|\tan\theta_{v2}|$ lies within 0.7-0.8.

* * * * *